United States Patent
Kim et al.

(10) Patent No.: US 12,238,812 B2
(45) Date of Patent: Feb. 25, 2025

(54) SUPPORT OF SERVICE CONTINUITY FOR HANDOVER BETWEEN SNPN AND PLMN

(71) Applicant: LG ELECTRONICS INC., Seoul (KR)

(72) Inventors: Seokjung Kim, Seoul (KR); Myungjune Youn, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

(21) Appl. No.: 17/905,271

(22) PCT Filed: Mar. 4, 2021

(86) PCT No.: PCT/KR2021/002660
§ 371 (c)(1),
(2) Date: Aug. 30, 2022

(87) PCT Pub. No.: WO2021/177734
PCT Pub. Date: Sep. 10, 2021

(65) Prior Publication Data
US 2023/0112312 A1    Apr. 13, 2023

(30) Foreign Application Priority Data

Mar. 6, 2020  (KR) .................... 10-2020-0028597
Mar. 13, 2020  (KR) .................... 10-2020-0031572

(51) Int. Cl.
*H04W 76/30*  (2018.01)
*H04W 36/00*  (2009.01)
*H04W 84/04*  (2009.01)

(52) U.S. Cl.
CPC ....... *H04W 76/30* (2018.02); *H04W 36/0016* (2013.01); *H04W 36/0022* (2013.01); *H04W 84/042* (2013.01)

(58) Field of Classification Search
CPC ............ H04W 76/30; H04W 36/0016; H04W 36/0022; H04W 84/04
See application file for complete search history.

(56) References Cited

U.S. PATENT DOCUMENTS

2019/0306068 A1* 10/2019 Kiss ..................... H04W 80/06
2019/0364607 A1* 11/2019 Lai ........................ H04W 76/16
(Continued)

FOREIGN PATENT DOCUMENTS

| KR | 2018-0109714 | 10/2018 |
| WO | 2020-092173 | 5/2020 |
| WO | 2020-102512 | 5/2020 |

OTHER PUBLICATIONS

PCT International Application No. PCT/KR2021/002660, International Search Report dated Jun. 10, 2021, 2 page.
(Continued)

*Primary Examiner* — Afshawn M Towfighi
(74) *Attorney, Agent, or Firm* — LEE, HONG, DEGERMAN, KANG & WAIMEY

(57) ABSTRACT

A method and apparatus for support of service continuity for handover between stand-alone non-public network (SNPN) and public land mobile network (PLMN) is provided. A session management function (SMF) of a first network transmits, to a user plane function (UPF) of the first network, a duplication request for the UPF of the first network to duplicate downlink (DL) data and send the duplicated DL data to both a next generation radio access network (NG-RAN) of the first network and a non-3GPP interworking function (N3IWF) of the first network. The SMF of the first network further transmits, to the N3IWF of the first network,
(Continued)

a data buffering request for the N3IWF of the first network to buffer the duplicated DL data.

15 Claims, 27 Drawing Sheets

(56) References Cited

U.S. PATENT DOCUMENTS

| | | | |
|---|---|---|---|
| 2020/0015117 A1 | 1/2020 | Wu | |
| 2020/0336960 A1* | 10/2020 | Park | H04W 8/08 |
| 2021/0100061 A1* | 4/2021 | Park | H04W 76/27 |

OTHER PUBLICATIONS

3rd Generation Partnership Project, "Technical Specification Group Services and System Aspects; Procedures for the 5G System (5GS); Stage 2 (Release 16)," 3GPP TS 23.502 V16.3.0, Dec. 2019, 560 pages.

Intel, "Support for Untrusted Non-3GPP access for SNPN," S2-1912598, SA WG2 Meeting #S2-136, Nov. 2019, 7 pages.

Ericsson, "Overview of Stand-alone NPN (SNPN)," Tdoc R2-1908977, 3GPP TSG-RAN WG2 #107, Aug. 2019, 12 pages.

3rd Generation Partnership Project, "Technical Specification Group Services and System Aspects; System architecture for the 5G System (5GS); Stage 2 (Release 16)," Sections 4.2.8.1 and 5.30.2 of 3GPP TS 23.501 V16.3.0, Dec. 2019, 417 pages.

3rd Generation Partnership Project, "Technical Specification Group Services and System Aspects; Procedures for the 5G System (5GS); Stage 2 (Release 16)," Sections 4.2.2.2 and 4.3.2 of 3GPP TS 23.502 V16.3.0, Dec. 2019, 560 pages.

* cited by examiner

SUPPORT OF SERVICE CONTINUITY FOR HANDOVER BETWEEN SNPN AND PLMN

CROSS-REFERENCE TO RELATED APPLICATION(S)

This application is the National Stage filing under 35 U.S.C. 371 of International Application No. PCT/KR2021/002660, filed on Mar. 4, 2021, which claims the benefit of earlier filing date and right of priority to Korean Application Nos. 10-2020-0028597, filed on Mar. 6, 2020, and 10-2020-0031572, filed on Mar. 13, 2020, the contents of which are all hereby incorporated by reference herein in their entireties.

TECHNICAL FIELD

The present disclosure relates to support of service continuity for handover between stand-alone non-public network (SNPN) and public land mobile network (PLMN).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Non-public networks (NPN) are intended for the sole use of a private entity such as an enterprise, and may be deployed in a variety of configurations, utilizing both virtual and physical elements. Specifically, they may be deployed as completely standalone networks, they may be hosted by a public land mobile network (PLMN), or they may be offered as a slice of a PLMN.

In any of these deployment options, it is expected that unauthorized user equipments (UEs), those that are not associated with the enterprise, will not attempt to access the non-public network, which could result in resources being used to reject that UE and thereby not be available for the UEs of the enterprise. It is also expected that UEs of the enterprise will not attempt to access a network they are not authorized to access. For example, some enterprise UEs may be restricted to only access the non-public network of the enterprise, even if PLMN coverage is available in the same geographic area. Other enterprise UEs may be able to access both a non-public network and a PLMN where specifically allowed.

SUMMARY

How to support service continuity for handover between a stand-alone non-public network (SNPN) and a public land mobile network (PLMN) may need to be addressed.

In an aspect, a method performed by a session management function (SMF) of a first network operating in a wireless communication is provided. The method includes transmitting, to a user plane function (UPF) of the first network, a duplication request for the UPF of the first network to duplicate downlink (DL) data and send the duplicated DL data to both a next generation radio access network (NG-RAN) of the first network and a non-3GPP interworking function (N3IWF) of the first network, and transmitting, to the N3IWF of the first network via an access and mobility management function (AMF) of the first network, a data buffering request for the N3IWF of the first network to buffer the duplicated DL data.

In another aspect, a method performed by a wireless device operating in a wireless communication is provided. The method includes, upon that a downlink (DL) data is duplicated in a user plane function (UPF) of a first network and sent to both a next generation radio access network (NG-RAN) of the first network and a non-3GPP interworking function (N3IWF) of the first network, receiving the duplicated DL data from the NG-RAN of the first network, moving to a second network from the first network, transmitting, to the N3IWF of the first network, 1) a path switch indication informing that the wireless device moves to the second network from the first network, and 2) a NG-RAN context release indication to trigger UE context release procedure to release resources in the NG-RAN of the first network, and receiving the duplicated DL data from the N3IWF of the first network via the NG-RAN of the second network.

In another aspect, an apparatus for implementing the above method is provided.

The present disclosure may have various advantageous effects.

For example, by creating a backup user plane connection in advance in case the wireless device moves between SNPN and PLMN, the process required to handover protocol data unit (PDU) sessions that used to provide services can be reduced.

For example, services can be quickly provided to users, and it can be prevented from disrupting the user experience.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
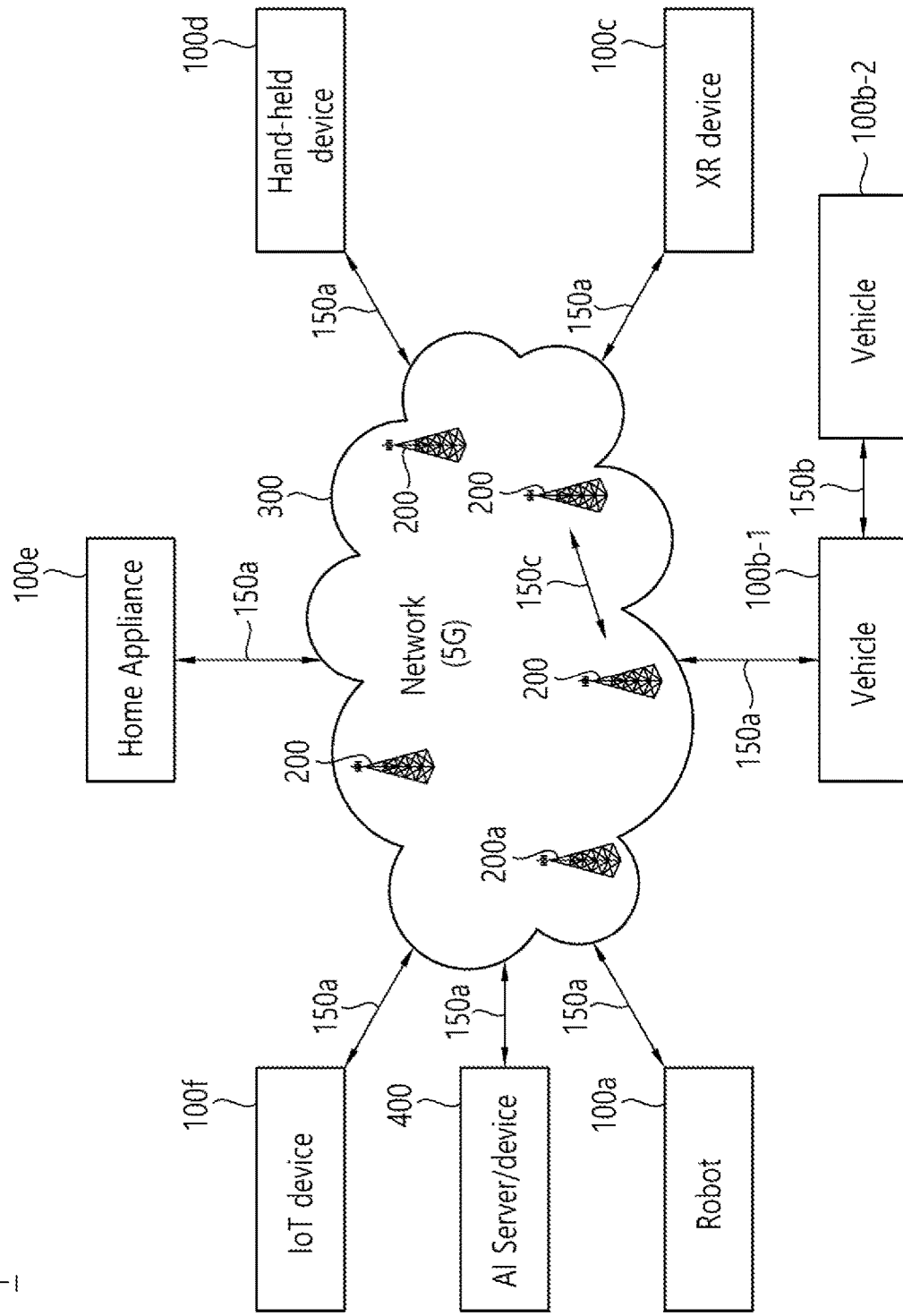
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
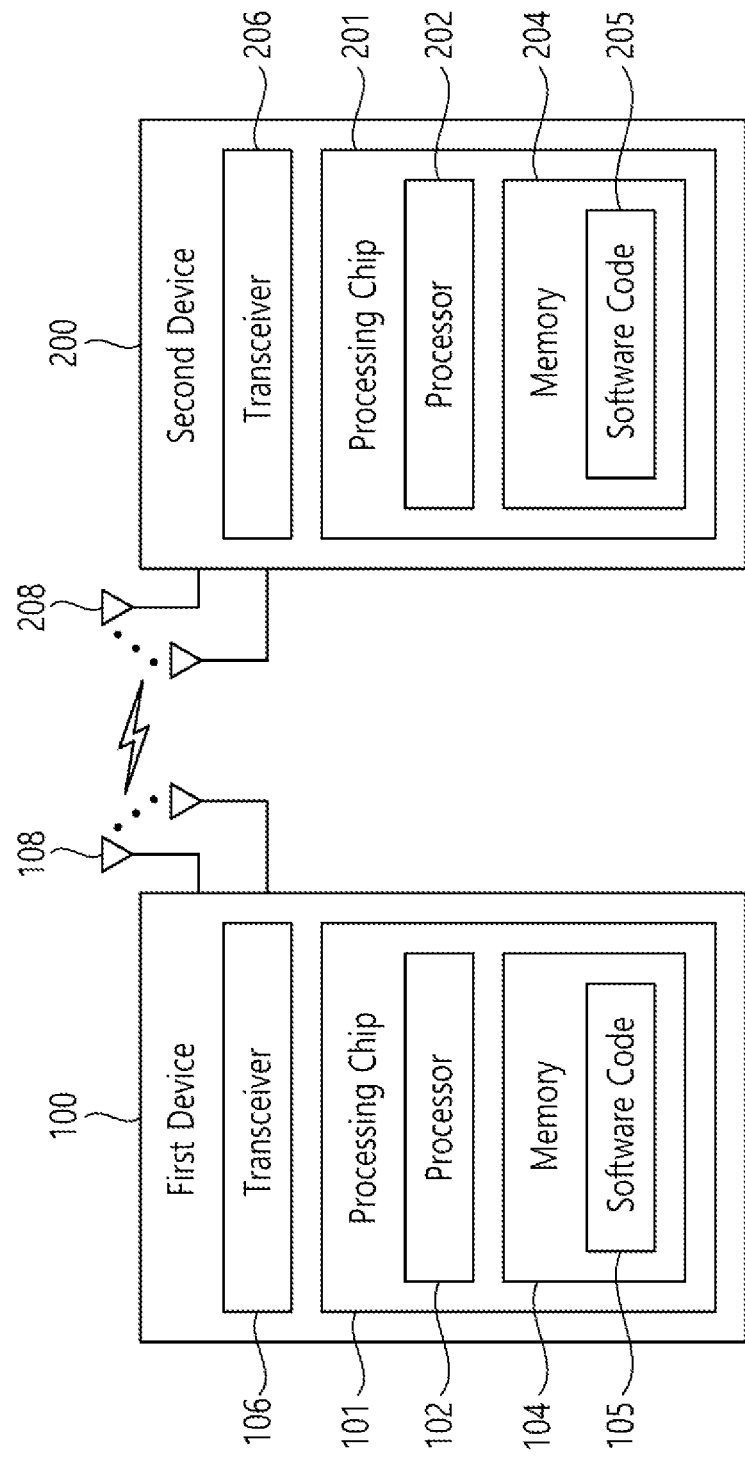
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
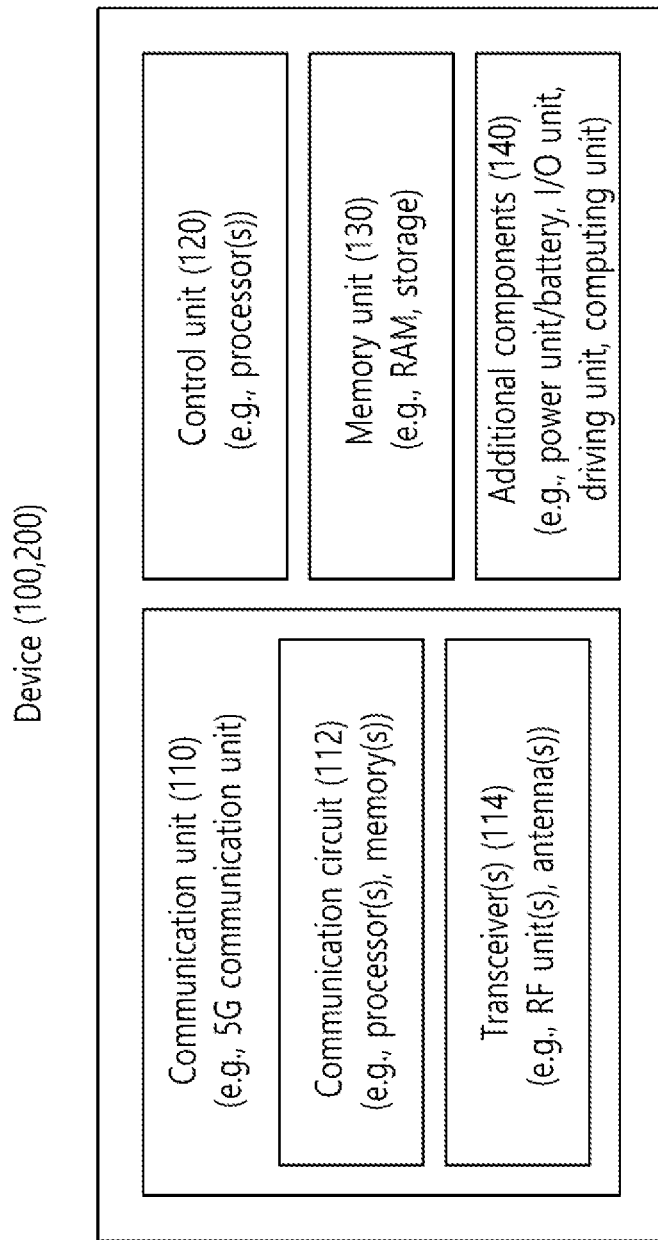
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
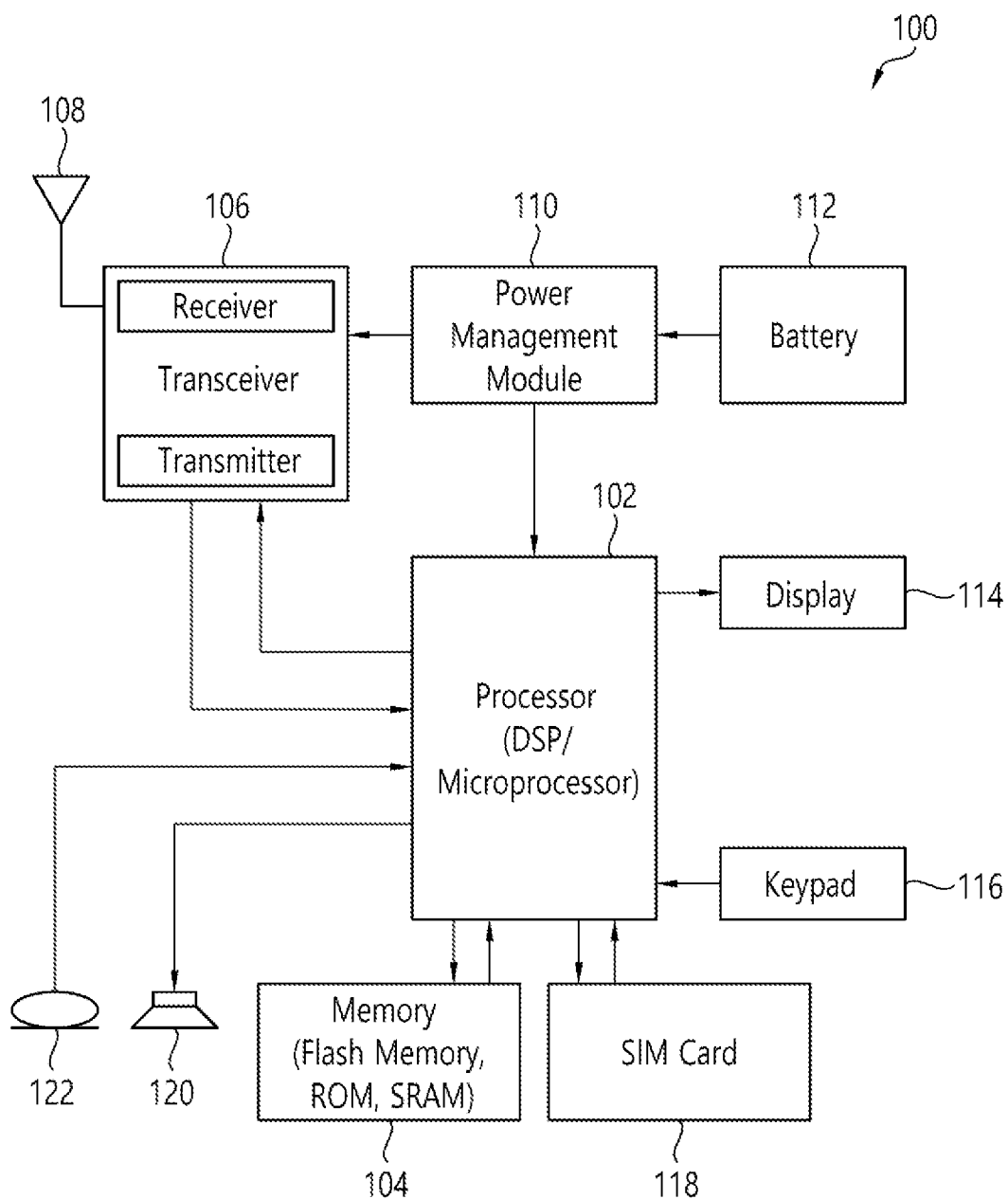
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
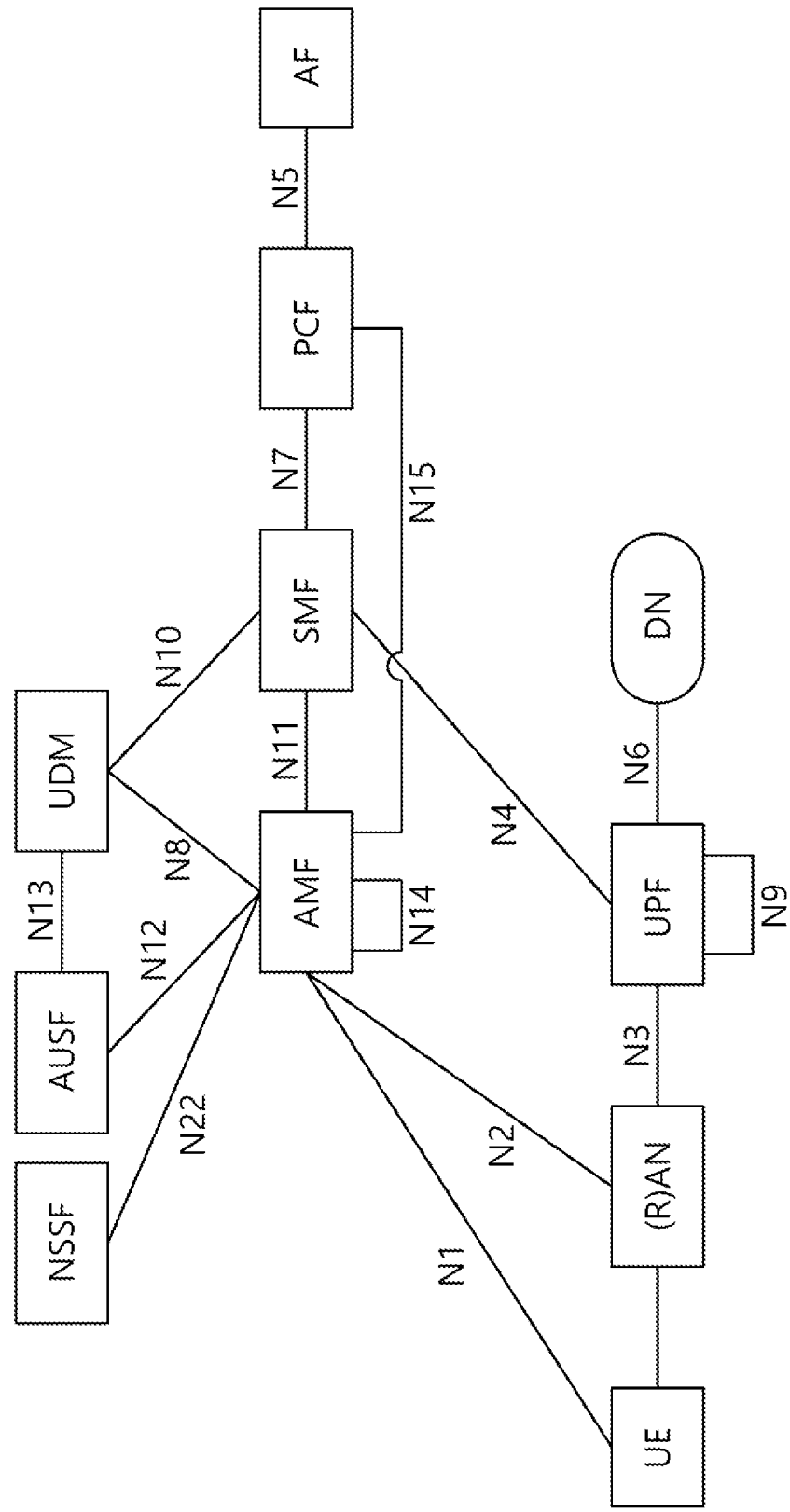
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)
Access and Mobility Management Function (AMF)
Data Network (DN), e.g., operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE)
(Radio) Access Network ((R)AN)
5G-Equipment Identity Register (5G-EIR)
Network Data Analytics Function (NWDAF)
CHarging Function (CHF)

Furthermore, the following network functions may be considered.

Non-3GPP InterWorking Function (N3IWF)
Trusted Non-3GPP Gateway Function (TNGF)
Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.
N2: Reference point between the (R)AN and the AMF.
N3: Reference point between the (R)AN and the UPF.
N4: Reference point between the SMF and the UPF.
N6: Reference point between the UPF and a Data Network.
N9: Reference point between two UPFs.

The following reference points show the interactions that exist between the NF services in the NFs.

N5: Reference point between the PCF and an AF.
N7: Reference point between the SMF and the PCF.
N8: Reference point between the UDM and the AMF.
N10: Reference point between the UDM and the SMF.
N11: Reference point between the AMF and the SMF.
N12: Reference point between the AMF and the AUSF.
N13: Reference point between the UDM and the AUSF.
N14: Reference point between two AMFs.
N15: Reference point between the PCF and the AMF in the case of non-roaming scenario, PCF in the visited network and AMF in the case of roaming scenario.
N16: Reference point between two SMFs, (in roaming case between SMF in the visited network and the SMF in the home network).
N22: Reference point between the AMF and the NSSF.

In some cases, a couple of NFs may need to be associated with each other to serve a UE.

A registration procedure is described. Section 4.2.2.2 of 3GPP TS 23.502 V16.3.0 (2019 December) can be referred.

Figure 6:
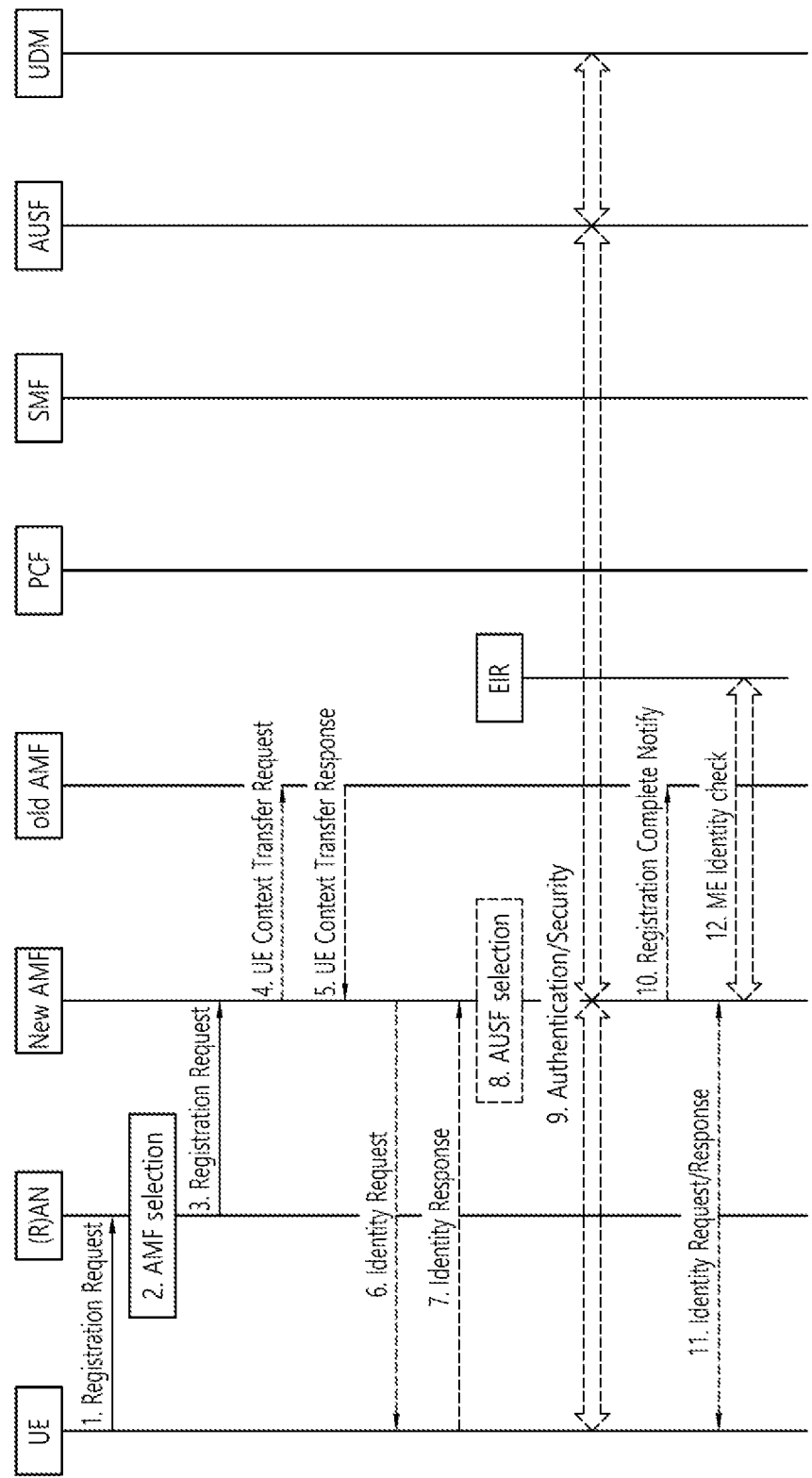
FIGS. 6 and 7 show an example of a registration procedure to which implementations of the present disclosure is applied.
Figure 7:
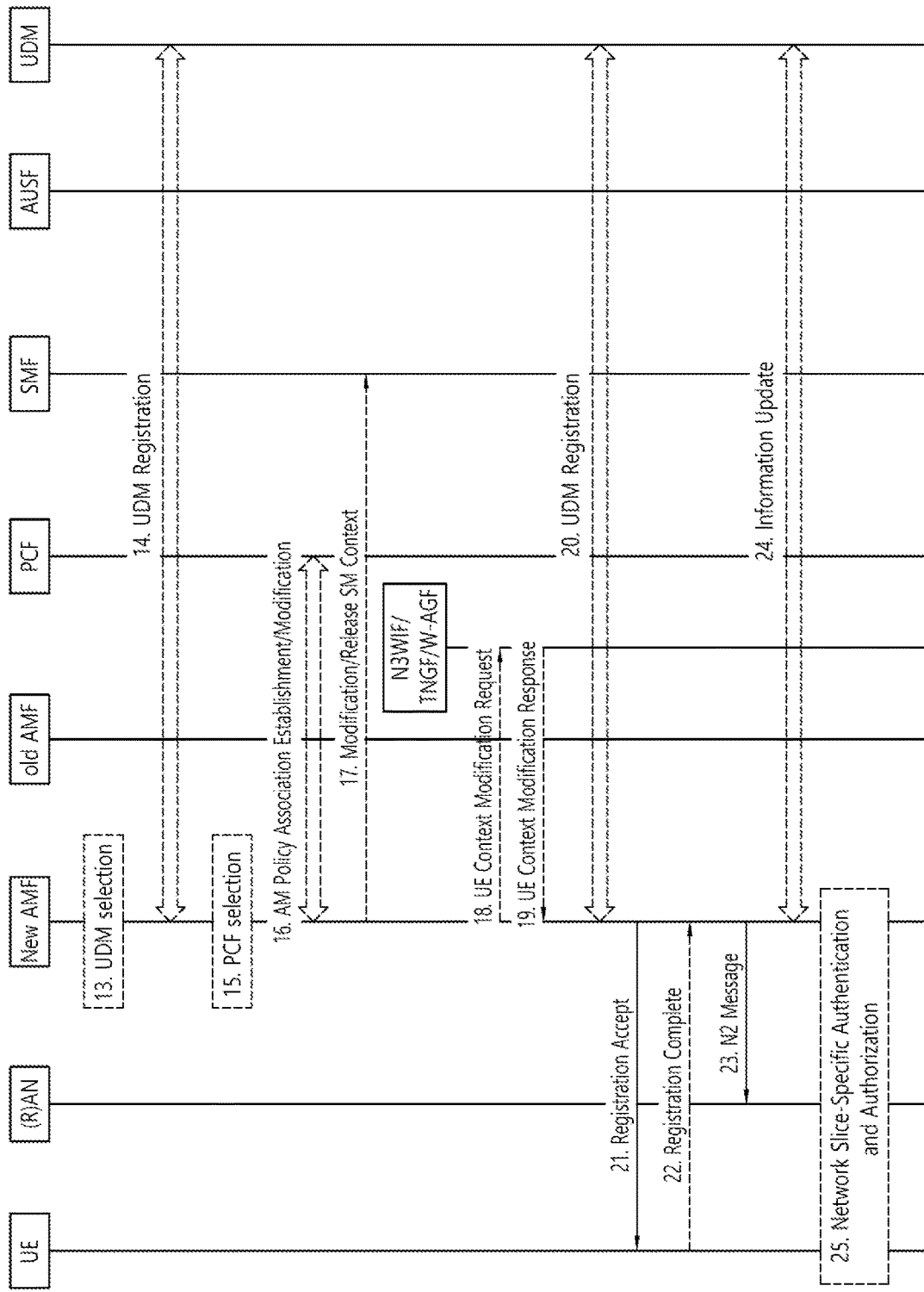

FIGS. 6 and 7 show an example of a registration procedure to which implementations of the present disclosure is applied.

A UE needs to register with the network to get authorized to receive services, to enable mobility tracking and to enable reachability. The UE initiates the registration procedure using one of the following registration types:

Initial registration to the 5GS; or
Mobility registration update; or
Periodic registration update; or
Emergency registration.

The general registration procedure in FIGS. 6 and 7 applies on all these registration procedures, but the periodic registration update need not include all parameters that are used in other registration cases.

The general registration procedure in FIGS. 6 and 7 is also used for the case of registration in 3GPP access when the UE is already registered in a non-3GPP access, and vice versa. Registration in 3GPP access when the UE is already registered in a non-3GPP access scenario may require an AMF change.

First, procedures of FIG. 6 are described.

(1) Step 1: The UE transmits a Registration Request message to the (R)AN. The Registration Request message corresponds to AN message.

The Registration Request message may include AN parameters. In the case of NG-RAN, the AN parameters include, e.g., 5G SAE temporary mobile subscriber identity (5G-S-TMSI) or globally unique AMF ID (GUAMI), the selected public land mobile network (PLMN) ID (or PLMN ID and network identifier (NID)) and Requested network slice selection assistance information (NSSAI). The AN parameters also include establishment cause. The establishment cause provides the reason for requesting the establishment of an RRC connection. Whether and how the UE includes the Requested NSSAI as part of the AN parameters is dependent on the value of the access stratum connection establishment NSSAI inclusion mode parameter.

The Registration Request message may include a registration type. The registration type indicates if the UE wants to perform an initial registration (i.e., the UE is in RM-DEREGISTERED state), a mobility registration update (i.e., the UE is in RM-REGISTERED state and initiates a registration procedure due to mobility or due to the UE needs to update its capabilities or protocol parameters, or to request a change of the set of network slices it is allowed to use), a periodic registration update (i.e., the UE is in RM-REGISTERED state and initiates a registration procedure due to the periodic registration update timer expiry) or an emergency registration (i.e., the UE is in limited service state).

When the UE is performing an initial registration, the UE shall indicate its UE identity in the Registration Request message as follows, listed in decreasing order of preference:

i) a 5G globally unique temporary identifier (5G-GUTI) mapped from an evolved packet system (EPS) GUTI, if the UE has a valid EPS GUTI.
ii) a native 5G-GUTI assigned by the PLMN to which the UE is attempting to register, if available;
iii) a native 5G-GUTI assigned by an equivalent PLMN to the PLMN to which the UE is attempting to register, if available;
iv) a native 5G-GUTI assigned by any other PLMN, if available.

v) Otherwise, the UE shall include its subscriber concealed identifier (SUCI) in the Registration Request message.

When the UE performing an initial registration has both a valid EPS GUTI and a native 5G-GUTI, the UE shall also indicate the native 5G-GUTI as additional GUTI. If more than one native 5G-GUTIs are available, the UE shall select the 5G-GUTI in decreasing order of preference among items (ii)-(iv) in the list above.

When the UE is performing an initial registration with a native 5G-GUTI, then the UE shall indicate the related GUAMI information in the AN parameters. When the UE is performing an initial registration with its SUCI, the UE shall not indicate any GUAMI information in the AN parameters.

For an emergency registration, the SUCI shall be included if the UE does not have a valid 5G-GUTI available; the permanent equipment identifier (PEI) shall be included when the UE has no subscriber permanent identifier (SUPI) and no valid 5G-GUTI. In other cases, the 5G-GUTI is included and it indicates the last serving AMF.

The Registration Request message may also include security parameters, PDU Session Status, etc. The security parameters are used for authentication and integrity protection. The PDU Session Status indicates the previously established PDU sessions in the UE. When the UE is connected to the two AMFs belonging to different PLMN via 3GPP access and non-3GPP access then the PDU Session status indicates the established PDU Session of the current PLMN in the UE.

(2) Step 2: The (R)AN selects an AMF.

If a 5G-S-TMSI or GUAMI is not included or the 5G-S-TMSI or GUAMI does not indicate a valid AMF, the (R)AN, based on (R)AT and requested NSSAI, if available, selects an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication-_RegistrationCompleteNotify service operation. If the authentication/security procedure fails, then the registration shall be rejected, and the new AMF may invoke the Namf-_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentity-Check_Get service operation.

Now, procedures of FIG. 7, which follow the procedures of FIG. 6, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSM-Context and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC Inactive Assistance Information to the NG-RAN.

(24) Step 24: The new AMF may perform information update towards the UDM.

(25) Step 25: The UE may execute Network Slice-Specific Authentication and Authorization procedure.

A PDU session establishment procedure is described. Section 4.3.2 of 3GPP TS 23.502 V16.3.0 (2019 December) can be referred.

Figure 8:
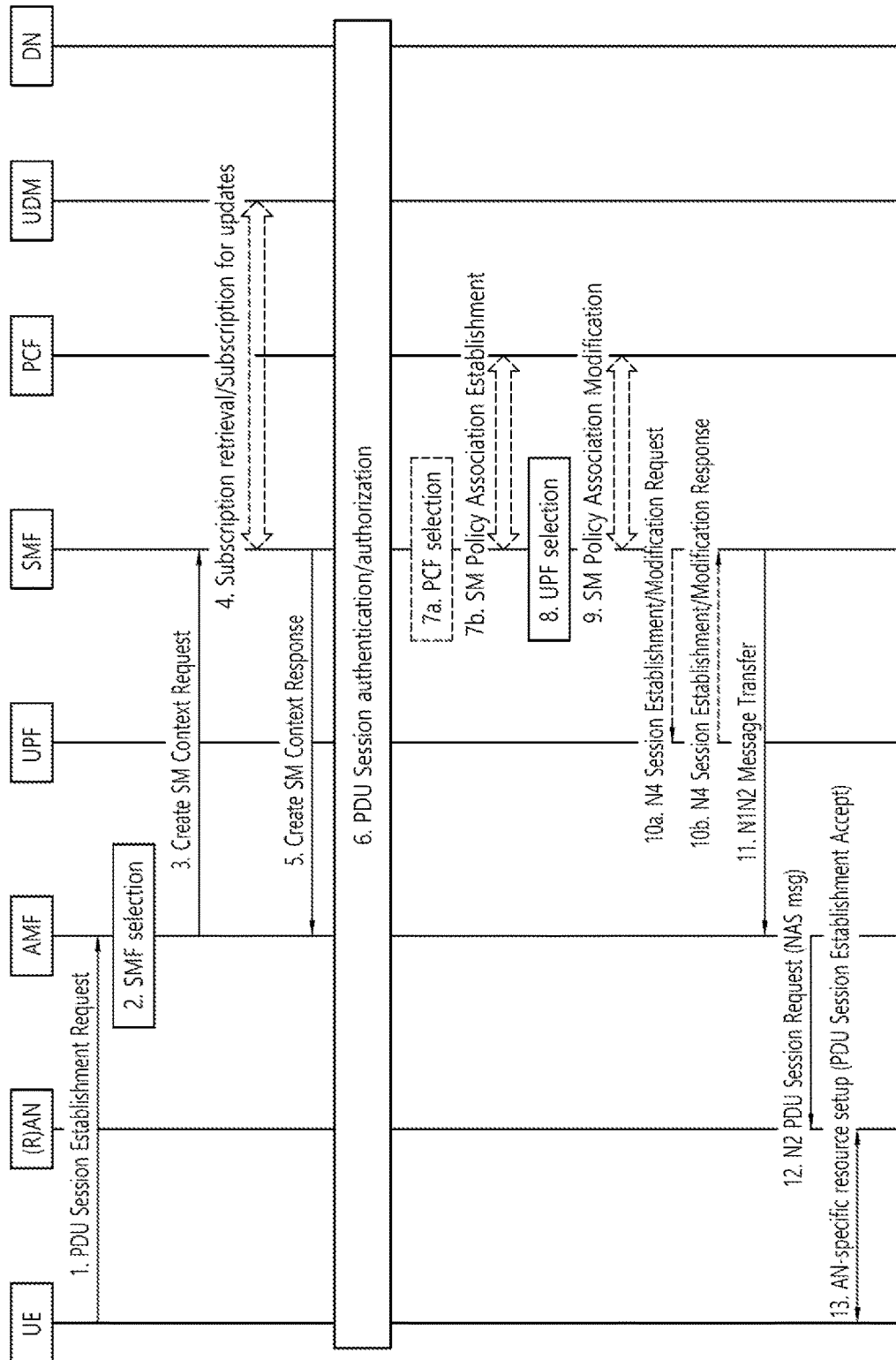
FIGS. 8 and 9 show an example of a PDU session establishment procedure to which implementations of the present disclosure is applied.
Figure 9:
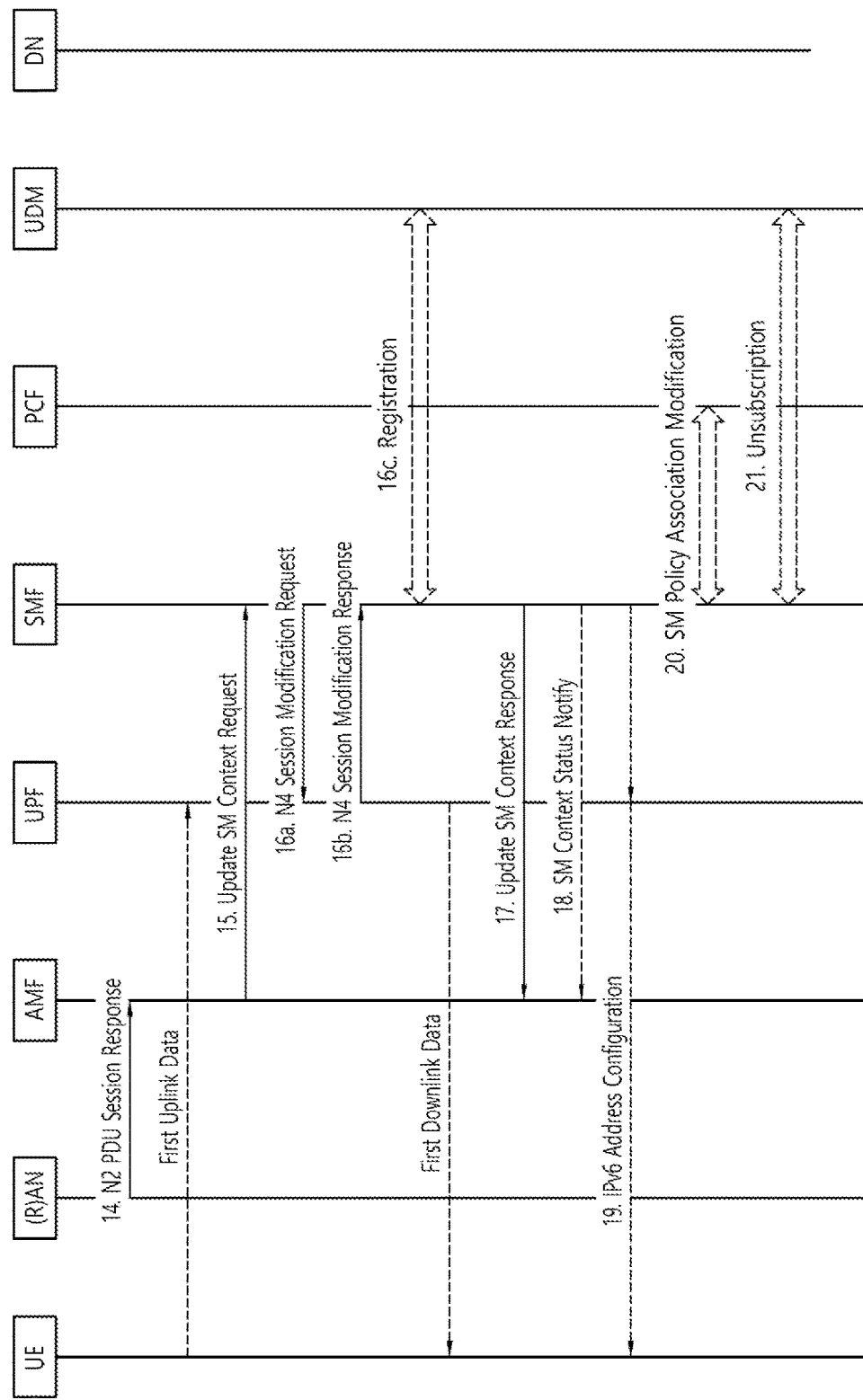

FIGS. 8 and 9 show an example of a PDU session establishment procedure to which implementations of the present disclosure is applied.

A PDU session establishment may correspond to:
  a UE initiated PDU session establishment procedure.
  a UE initiated PDU session handover between 3GPP and non-3GPP.
  a UE initiated PDU session handover from EPS to 5GS.
  a network triggered PDU session establishment procedure.

A PDU session may be associated either (a) with a single access type at a given time, i.e., either 3GPP access or non-3GPP access, or (b) simultaneously with multiple access types, i.e., one 3GPP access and one non-3GPP access. A PDU session associated with multiple access types is referred to as multi access PDU (MA PDU) session and it may be requested by access traffic steering, switching, splitting (ATSSS)-capable UEs.

FIGS. 8 and 9 specify the procedures for establishing PDU sessions associated with a single access type at a given time.

The procedure shown in FIGS. 8 and 9 assumes that the UE has already registered on the AMF thus unless the UE is emergency registered the AMF has already retrieved the user subscription data from the UDM.

First, procedures of FIG. 8 are described.

(1) Step 1: In order to establish a new PDU session, the UE generates a new PDU session ID.

The UE initiates the UE requested PDU session establishment procedure by the transmission of a NAS message containing a PDU Session Establishment Request message within the N1 SM container. The PDU Session Establishment Request message includes a PDU session ID, Requested PDU Session Type, a Requested session and service continuity (SSC) mode, SGSM Capability, protocol configuration options (PCO), SM PDU DN Request Container, UE Integrity Protection Maximum Data Rate, etc.

The Request Type indicates "Initial request" if the PDU session establishment is a request to establish a new PDU session and indicates "Existing PDU Session" if the request refers to an existing PDU session switching between 3GPP access and non-3GPP access or to a PDU session handover from an existing packet data network (PDN) connection in EPC. The Request Type indicates "Emergency Request" if the PDU session establishment is a request to establish a PDU session for emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The UE includes the S-NSSAI from the Allowed NSSAI of the current access type. If the Mapping of Allowed NSSAI was provided to the UE, the UE shall provide both the S-NSSAI of the visited PLMN (VPLMN) from the Allowed NSSAI and the corresponding S-NSSAI of the HPLMN from the Mapping Of Allowed NSSAI.

(2) Step 2: The AMF selects an SMF. If the Request Type indicates "Initial request" or the request is due to handover from EPS or from non-3GPP access serving by a different AMF, the AMF stores an association of the S-NSSAI(s), the data network name (DNN), the PDU session ID, the SMF ID as well as the Access Type of the PDU session.

If the Request Type is "initial request" and if the Old PDU session ID indicating the existing PDU session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The AMF updates the Access Type stored for the PDU session.

If the Request Type indicates "Existing PDU Session" referring to an existing PDU session moved between 3GPP access and non-3GPP access, then if the serving PLMN S-NSSAI of the PDU session is present in the Allowed NSSAI of the target access type, the PDU session establishment procedure can be performed in the following cases:
  the SMF ID corresponding to the PDU session ID and the AMF belong to the same PLMN;
  the SMF ID corresponding to the PDU session ID belongs to the HPLMN;
Otherwise the AMF shall reject the PDU session establishment request with an appropriate reject cause.

The AMF shall reject a request coming from an emergency registered UE and the Request Type indicates neither "Emergency Request" nor "Existing Emergency PDU Session".

(3) Step 3: If the AMF does not have an association with an SMF for the PDU session ID provided by the UE (e.g., when Request Type indicates "initial request"), the AMF invokes Create SM Context Request procedure (e.g., Nsmf_PDUSession_CreateSMContext Request). If the AMF already has an association with an SMF for the PDU session ID provided by the UE (e.g., when Request Type indicates "existing PDU Session"), the AMF invokes Update SM Context Request procedure (e.g., Nsmf_PDUSession_UpdateSMContext Request).

The AMF sends the S-NSSAI of the serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE. The AMF forwards the PDU session ID together with the N1 SM container containing the PDU Session Establishment Request message received from the UE. The generic public subscription identifier (GPSI) shall be included if available at AMF.

The AMF provides the PEI instead of the SUPI when the UE in limited service state has registered for emergency services without providing a SUPI. In case the UE in limited service state has registered for Emergency services with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

The AMF may include a PCF ID in the Nsmf_PDUSession_CreateSMContext Request. This PCF ID identifies the home PCF (H-PCF) in the non-roaming case and the visited PCF (V-PCF) in the LBO roaming case.

(4) Step 4: If session management subscription data for corresponding SUPI, DNN and S-NSSAI of the HPLMN is not available, then SMF may retrieve the session management subscription data from the UDM and subscribes to be notified when this subscription data is modified.

(5) Step 5: The SMF transmits either Create SM Context Response message (e.g., Nsmf_PDUSession_CreateSMContext Response) or Update SM Context Response message (e.g., Nsmf_PDUSession_UpdateSMContext Response) to the AMF, depending on the request received in step 3.

If the SMF received Nsmf_PDUSession_CreateSMContext Request in step 3 and the SMF is able to process the PDU session establishment request, the SMF creates an SM context and responds to the AMF by providing an SM Context ID.

When the SMF decides to not accept to establish a PDU session, the SMF rejects the UE request via NAS SM signaling including a relevant SM rejection cause by responding to the AMF with Nsmf_PDUSession_CreateSMContext Response. The SMF also indicates to the AMF that the PDU session ID is to be considered as released, the SMF proceeds to step 20 below and the PDU session establishment procedure is stopped.

(6) Step 6: Optional secondary authentication/authorization may be performed.

(7a) Step 7a: If dynamic policy and charging control (PCC) is to be used for the PDU session, the SMF may perform PCF selection.

(7b) Step 7b: The SMF may perform an SM Policy Association Establishment procedure to establish an SM Policy association with the PCF and get the default PCC rules for the PDU session.

(8) Step 8: The SMF selects one or more UPFs.

(9) Step 9: The SMF may perform an SMF initiated SM Policy Association Modification procedure to provide information on the policy control request trigger condition(s) that have been met.

(10) Step 10: If Request Type indicates "initial request", the SMF may initiate an N4 Session Establishment procedure with the selected UPF. Otherwise, the SMF may initiate an N4 Session Modification procedure with the selected UPF In step 10a, the SMF may send an N4 Session Establishment/Modification Request to the UPF and provides packet detection, enforcement and reporting rules to be installed on the UPF for this PDU session. In step 10b, the UPF may acknowledge by sending an N4 Session Establishment/Modification Response.

(11) Step 11: The SMF transmits a N1N2Message Transfer message (e.g., Namf_Communication_N1N2MessageTransfer) to the AMF.

The N1N2Message Transfer message may include N2 SM information. The N2 SM information carries information that the AMF shall forward to the (R)AN which may include:

- The CN Tunnel Info: Core network address(es) of the N3 tunnel corresponding to the PDU session;
- One or multiple quality of service (QoS) profiles and the corresponding QoS flow IDs (QFIs);
- The PDU session ID: indicate to the UE the association between (R)AN resources and a PDU session for the UE.
- S-NSSAI with the value for the serving PLMN (i.e., the HPLMN S-NSSAI or, in LBO roaming case, the VPLMN S-NSSAI).
- User Plane Security Enforcement information determined by the SMF.
- If the User Plane Security Enforcement information indicates that integrity protection is "Preferred" or "Required", the SMF also includes the UE Integrity Protection Maximum Data Rate as received in the PDU Session Establishment Request message.
- Redundancy sequence number (RSN) parameter The N1N2Message Transfer message may include N1 SM container. The N1 SM container contains the PDU Session Establishment Accept message that the AMF shall provide to the UE. The PDU Session Establishment Accept message includes S-NSSAI from the Allowed NSSAI. For LBO roaming scenario, the PDU Session Establishment Accept message includes the S-NSSAI from the Allowed NSSAI for the VPLMN and also it includes the corresponding S-NSSAI of the HPLMN from the Mapping Of Allowed NSSAI that SMF received in step 3.

Multiple QoS Rules, QoS flow level, QoS parameters if needed for the QoS Flow(s) associated with those QoS rule(s) and QoS Profiles may be included in the PDU Session Establishment Accept message within the N1 SM container and in the N2 SM information.

If the PDU session establishment failed anywhere between step 5 and step 11, then the N1N2Message Transfer message shall include the N1 SM container with a PDU Session Establishment Reject message and shall not include any N2 SM information. The (R)AN sends the NAS message containing the PDU Session Establishment Reject message to the UE. In this case, steps 12-17 are skipped.

(12) Step 12: The AMF sends the NAS message containing PDU Session ID and PDU Session Establishment Accept message targeted to the UE and the N2 SM information received from the SMF within the N2 PDU Session Request message to the (R)AN.

(13) Step 13: The (R)AN may issue AN specific signaling exchange with the UE that is related with the information received from SMF. For example, in case of a NG-RAN, an RRC connection reconfiguration may take place with the UE establishing the necessary NG-RAN resources related to the QoS rules for the PDU session request received in step 12.

The (R)AN forwards the NAS message (PDU Session ID, N1 SM container (PDU Session Establishment Accept message)) provided in step 12 to the UE. The (R)AN shall only provide the NAS message to the UE if the AN specific signaling exchange with the UE includes the (R)AN resource additions associated to the received N2 command.

If the N2 SM information is not included in the step 11, then the following steps 14 to 16*b* and step 17 are omitted.

Now, procedures of FIG. 9, which follow the procedures of FIG. 8, are described.

(14) Step 14: The (R)AN transmits a N2 PDU Session Response message to the AMF. The N2 PDU Session Response message may include PDU session ID, Cause, N2 SM information (PDU Session ID, AN Tunnel Info, List of accepted/rejected QFI(s), User Plane Enforcement Policy Notification)), etc.

(15) Step 15: The AMF transmits an Update SM Context Request message (e.g., Nsmf_PDUSession_UpdateSMContext Request) to the SMF. The AMF forwards the N2 SM information received from (R)AN to the SMF.

(16*a*) Step S16*a*: The SMF initiates an N4 Session Modification procedure with the UPF. The SMF provides AN Tunnel Info to the UPF as well as the corresponding forwarding rules.

(16*b*) Step S16*b*: The UPF provides an N4 Session Modification Response to the SMF.

After this step, the UPF may deliver any DL packets to the UE that may have been buffered for this PDU session.

(16*c*) Step 16*c*: If the SMF has not yet registered for this PDU session, then the SMF may register with the UDM for a given PDU Session.

(17) Step 17: The SMF transmits an Update SM Context Response message (e.g., Nsmf_PDUSession_UpdateSMContext Response) to the AMF.

After this step, the AMF forwards relevant events subscribed by the SMF.

(18) Step 18: If during the procedure, any time after step 5, the PDU session establishment is not successful, the SMF may inform the AMF by invoking Nsmf_PDUSession_SMContextStatusNotify (Release). The SMF may also release any N4 session(s) created, any PDU session address if allocated (e.g., IP address) and release the association with PCF, if any. In this case, step 19 is skipped.

(19) Step 19: In the case of PDU Session Type IPv6 or IPv4v6, the SMF may generate an IPv6 Router Advertisement and send it to the UE.

(20) Step 20: The SMF may perform SMF initiated SM Policy Association Modification.

(21) Step 21: If the PDU Session establishment failed after step 4, the SMF may unsubscribe to the modifications of session management subscription data, if the SMF is no more handling a PDU session of the UE.

Support of non-3GPP access is described. Section 4.2.8.1 of 3GPP TS 23.501 V16.3.0 (2019 December) can be referred.

Figure 10:
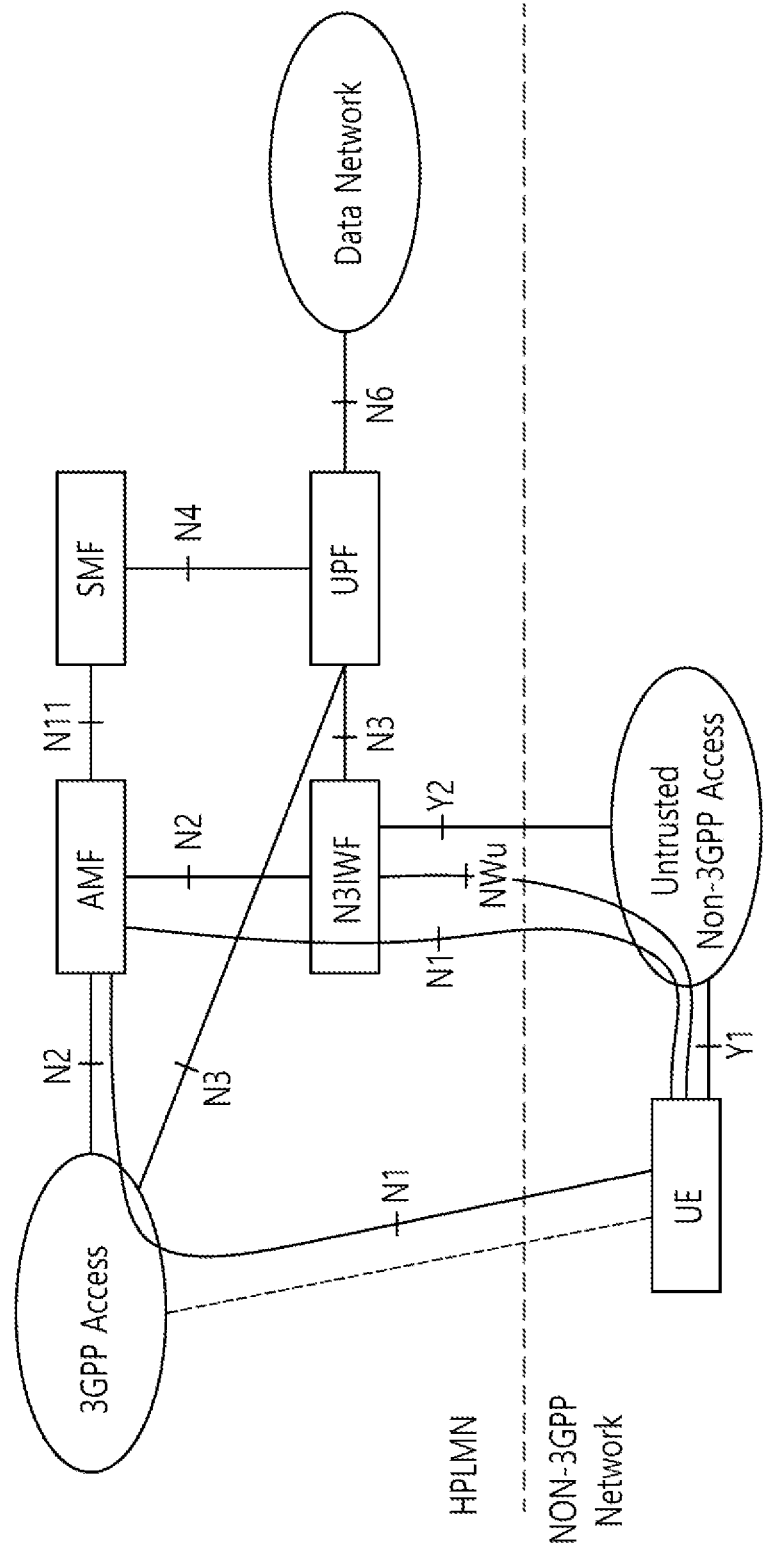
FIG. 10 shows an example of non-roaming architecture for 5GC with untrusted non-3GPP access to which implementations of the present disclosure is applied.

FIG. 10 shows an example of non-roaming architecture for 5GC with untrusted non-3GPP access to which implementations of the present disclosure is applied.

The 5G Core Network supports connectivity of UEs via non-3GPP access networks, e.g., wireless local area network (WLAN) access networks.

The 5G Core Network supports both untrusted non-3GPP access networks and trusted non-3GPP access networks (TNANs).

An untrusted non-3GPP access network shall be connected to the 5G Core Network via a N3IWF, whereas a trusted non-3GPP access network shall be connected to the 5G Core Network via a TNGF. Both the N3IWF and the TNGF interface with the 5G Core Network CP and UP functions via the N2 and N3 interfaces, respectively.

A non-3GPP access network may advertise the PLMNs for which it supports trusted connectivity and the type of supported trusted connectivity (e.g., "5G connectivity"). Therefore, the UEs can discover the non-3GPP access networks that can provide trusted connectivity to one or more PLMNs.

When the UE decides to use untrusted non-3GPP access to connect to a 5G Core Network in a PLMN:
 the UE first selects and connects with a non-3GPP access network; and then
 the UE selects a PLMN and an N3IWF in this PLMN. The PLMN/N3IWF selection and the non-3GPP access network selection are independent.

When the UE decides to use trusted non-3GPP access to connect to a 5G Core Network in a PLMN:
 the UE first selects a PLMN; and then
 the UE selects a non-3GPP access network (a TNAN) that supports trusted connectivity to the selected PLMN. In this case, the non-3GPP access network selection is affected by the PLMN selection.

A UE that accesses the 5G Core Network over a standalone non-3GPP access shall, after UE registration, support NAS signaling with 5G Core Network control-plane functions using the N1 reference point.

When a UE is connected via a NG-RAN and via a standalone non-3GPP access, multiple N1 instances shall exist for the UE, i.e., there shall be one N1 instance over NG-RAN and one N1 instance over non-3GPP access.

A UE simultaneously connected to the same 5G Core Network of a PLMN over a 3GPP access and a non-3GPP access shall be served by a single AMF in this 5G Core Network.

When a UE is connected to a 3GPP access of a PLMN, if the UE selects a N3IWF and the N3IWF is located in a PLMN different from the PLMN of the 3GPP access, e.g., in a different VPLMN or in the HPLMN, the UE is served separately by the two PLMNs. The UE is registered with two separate AMFs. PDU sessions over the 3GPP access are served by V-SMFs different from the V-SMF serving the PDU Sessions over the non-3GPP access. The same can be true when the UE uses trusted non-3GPP access, i.e., the UE may select one PLMN for 3GPP access and a different PLMN for trusted non-3GPP access.

The PLMN selection for the 3GPP access does not depend on the PLMN that is used for non-3GPP access. In other words, if a UE is registered with a PLMN over a non-3GPP access, the UE performs PLMN selection for the 3GPP access independently of this PLMN.

A UE shall establish an IPsec tunnel with the N3IWF or with the TNGF in order to register with the 5G Core Network over non-3GPP access.

It shall be possible to maintain the UE NAS signaling connection with the AMF over the non-3GPP access after all the PDU sessions for the UE over that access have been released or handed over to 3GPP access.

N1 NAS signaling over standalone non-3GPP accesses shall be protected with the same security mechanism applied for N1 over a 3GPP access.

Stand-alone non-public network (SNPN) is described. Section 5.30.2 of 3GPP TS 23.501 V16.3.0 (2019 December) can be referred.

An SNPN is operated by an NPN operator and not relying on network functions provided by a PLMN. On the other hand, a public network integrated (PNI) NPN is a non-public network deployed with the support of a PLMN.

SNPN 5GS deployments are based on the architecture depicted above in FIG. 5, the architecture for 5GC with untrusted non-3GPP access, described above in FIG. 10, for access to SNPN services via a PLMN (and vice versa) and the additional functionality described below.

Interworking with EPS is not supported for SNPN.

The combination of a PLMN ID and network identifier (NID) identifies an SNPN.

The NID shall support two assignment models:

Self-assignment: NIDs are chosen individually by SNPNs at deployment time (and may therefore not be unique) but use a different numbering space than the coordinated assignment NIDs.

Coordinated assignment: NIDs are assigned using one of the following two options:

1) The NID is assigned such that it is globally unique independent of the PLMN ID used; or 2) The NID is assigned such that the combination of the NID and the PLMN ID is globally unique.

An optional human-readable network name helps to identify an SNPN during manual SNPN selection.

When a UE is set to operate in SNPN access mode, the UE does not perform normal PLMN selection procedures.

UEs operating in SNPN access mode read the available PLMN IDs and list of available NIDs from the broadcast system information and take them into account during network selection.

For automatic network selection, the UE selects and attempts to register with the available SNPN identified by a PLMN ID and NID for which the UE has SUPI and credentials.

For manual network selection, UEs operating in SNPN access mode provide to the user the list of NIDs and related human-readable names (if available) of the available SNPNs the UE has respective SUPI and credentials for.

When a UE performs initial registration to an SNPN, the UE shall indicate the selected NID and the corresponding PLMN ID to NG-RAN. NG-RAN shall inform the AMF of the selected PLMN ID and NID.

To access PLMN services, a UE in SNPN access mode that has successfully registered with an SNPN may perform another registration via the SNPN user plane with a PLMN (using the credentials of that PLMN) following the same architectural principles as specified above for the non-3GPP access and the SNPN taking the role of "Untrusted non-3GPP access" in FIG. 10.

To access SNPN services, a UE that has successfully registered with a PLMN may perform another registration via the PLMN user plane with an SNPN (using the credentials of that SNPN) following the same architectural principles as specified above for the non-3GPP access and the PLMN taking the role of "Untrusted non-3GPP access" in FIG. 10.

Further enhancement of NPN is being discussed. One of the objectives for further enhancement of NPN is to support data forwarding between PLMN and SNPN to reduce data loss.

For example, data forwarding between PLMN and SNPN for service continuity may be considered in a case where NPN supports video, imaging and audio for professional applications (VIAPA). In this case, it may be addressed whether there are support for service continuity (assuming PSA may reside in either PLMN or in the NPN) between PLMN and NPN (SNPN or PNI-NPN) with overlapping radio coverage areas. The data service from NPN can be with low latency and high data rate service while serving massive number of UEs in a small area, e.g., the integrated audience multicast service in large live production events, such as music festivals.

When a UE receiving VIAPA services via the PLMN moves to the SNPN, the UE should register with SNPN, establish PDU sessions, and then register again via PLMN's N3IWF, and then perform handover of PDU sessions that provided the VIAPA services. In this process, there is no way to forward DL data packets already sent to PLMN's NG-RAN to PLMN's N3IWF. This can lead to unnecessary latency until the corresponding DL data packets are delivered back to the UE via the SNPN and PLMN's N3IWF, thus undermining the user experience.

How to support service continuity for handover between the PLMN and SNPN may need to be addressed.

According to implementations of the present disclosure, the UE that was receiving VIAPA service through the source network (e.g., PLMN or SNPN) may request UP connection for backup via the N3IWF of the source network in case of moving to the target network (e.g., SNPN or PLMN). Based on the duplication request for DL data packets from the SMF of the source network, the UPF of the source network may send the same DL data packets to both the NG-RAN of the source network and the N3IWF of the source network. Based on the buffering request from the SMF of the source network, the N3IWF of the source network may buffer DL data packets.

Upon receiving the MOBIKE update address message from the UE as the UE moves from the source network to the target network, the N3IWF of the source network may send the buffered DL data packet to the UE. With the MOBIKE update address message, a separate indication may be sent to inform that the UE is connected to the SMF of the source network via the N3IWF of the source network, and to inform whether 3GPP access to the NG-RAN of the source network should be maintained.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
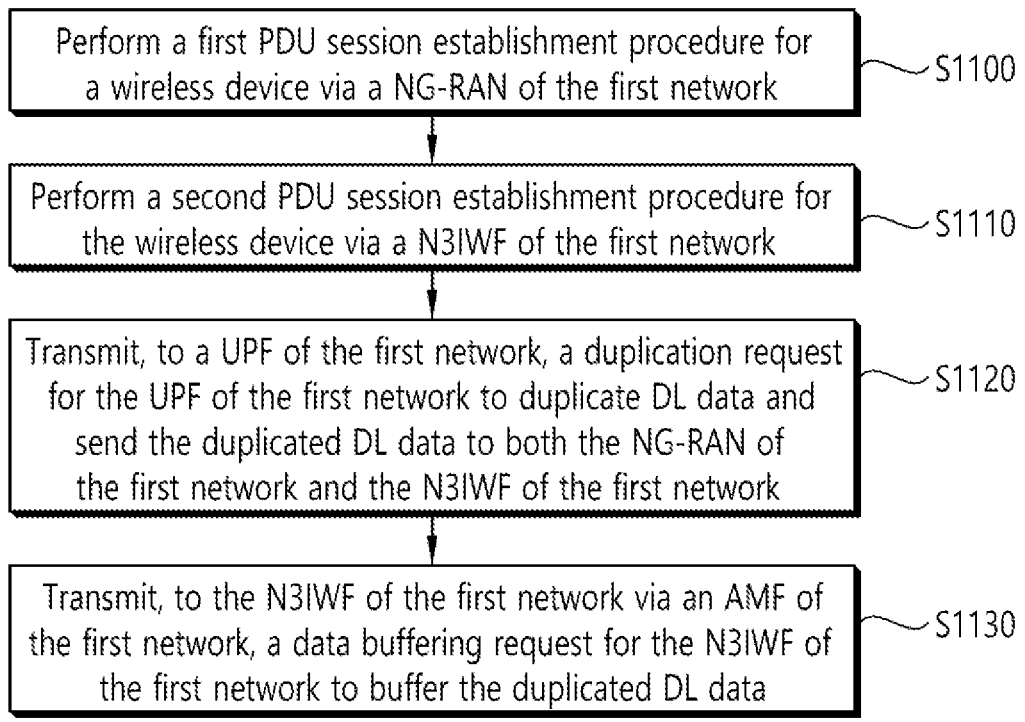
FIG. 11 shows an example of a method performed by a SMF of a first network to which implementations of the present disclosure is applied.

FIG. 11 shows an example of a method performed by a SMF of a first network to which implementations of the present disclosure is applied.

FIG. 11 may correspond a procedure in perspective of the PLMN SMF according to the embodiment 1 of the present disclosure to be described later by referring to FIGS. 13 to 17.

In step S1100, the SMF of the first network performs a first PDU session establishment procedure for a wireless device via a NG-RAN of the first network.

In step S1110, the SMF of the first network performs second PDU session establishment procedure for the wireless device via a N3IWF of the first network.

In some implementations, the second PDU session establishment procedure may comprise receiving a PDU Session Establishment Request message which includes 1) a PDU session ID of an on-going PDU session via the NG-RAN of the first network, and 2) a request type set to handover preparation between the first network and a second network.

In step S1120, the SMF of the first network transmits, to a UPF of the first network, a duplication request for the UPF of the first network to duplicate downlink (DL) data and send the duplicated DL data to both the NG-RAN of the first network and the N3IWF of the first network.

In step S1130, the SMF of the first network transmits, to the N3IWF of the first network via an AMF of the first network, a data buffering request for the N3IWF of the first network to buffer the duplicated DL data.

In some implementations, after the wireless device is moved from the first network to a second network, the SMF of the first network may receive a Update SM Context Request message (e.g., Nsmf_PDUSession_UpdateSMContext Request message) from the AMF of the first network to indicate that the wireless devices accesses to the N3IWF of the first network via a NG-RAN of the second network. The Update SM Context Request message may include a NG-RAN Context Release indication to trigger UE context release procedure to release resources in the NG-RAN of the first network. Based on the NG-RAN Context Release indication, the SMF of the first network may transmit a duplication stop indication which indicates the UPF of the first network to stop duplicating the DL data.

In some implementations, the SMF of the first network may transmit a Update SM Context Response message to the AMF of the first network in response to the Update SM Context Request message. The Update SM Context Response message may include a data delivery request indication for the N3IWF of the first network to initiate delivery of the DL data.

In some implementations, the first network may be a PLMN, and the second network may be a SNPN. Or, the first network may be a SNPN, and the second network may be a PLMN.

Figure 12:
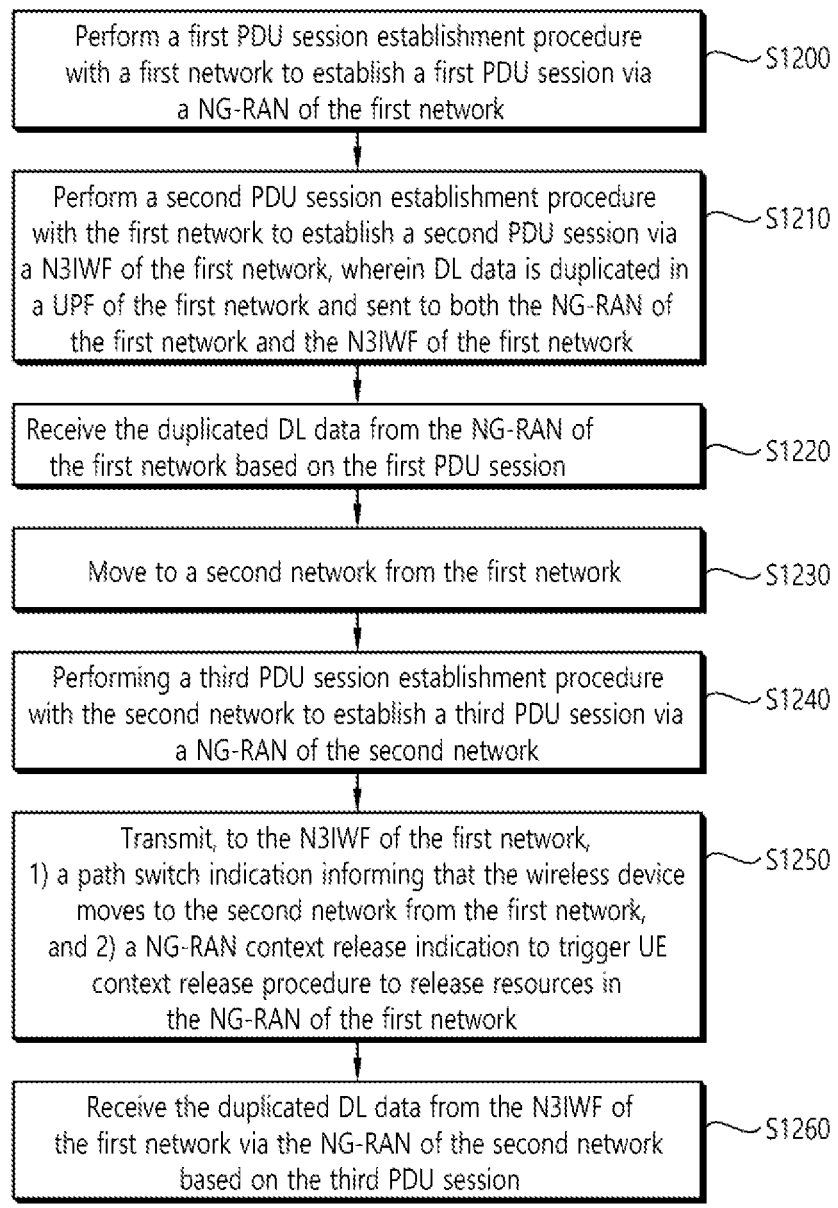
FIG. 12 shows an example of a method performed by a wireless device to which implementations of the present disclosure is applied.

FIG. 12 shows an example of a method performed by a wireless device to which implementations of the present disclosure is applied.

FIG. 12 may correspond a procedure in perspective of the UE according to the embodiment 1 of the present disclosure to be described later by referring to FIGS. 13 to 17.

In step S1200, the wireless device performs a first PDU session establishment procedure with a first network to establish a first PDU session via a NG-RAN of the first network.

In step S1210, the wireless device performs second PDU session establishment procedure with the first network to establish a second PDU session via a N3IWF of the first network. DL data is duplicated in a UPF of the first network and sent to both the NG-RAN of the first network and the N3IWF of the first network.

In some implementations, the second PDU session establishment procedure may comprise transmitting a PDU Session Establishment Request message which includes 1) a PDU session ID of an on-going PDU session via the NG-RAN of the first network, and 2) a request type set to handover preparation between the first network and a second network.

In step S1220, the wireless device receives the duplicated DL data from the NG-RAN of the first network based on the first PDU session.

In step S1230, the wireless device moves to a second network from the first network.

In step S1240, the wireless device performs a third PDU session establishment procedure with the second network to establish a third PDU session via a NG-RAN of the second network.

In step S1250, the wireless device transmits, to the N3IWF of the first network, 1) a path switch indication informing that the wireless device moves to the second network from the first network, and 2) a NG-RAN context release indication to trigger UE context release procedure to release resources in the NG-RAN of the first network.

In some implementations, 1) the path switch indication and 2) the NG-RAN context release indication may be transmitted via a MOBIKE update address message. A MOBIKE address verification message may be received from the N3IWF of the first network in response to the MOBIKE update address message.

In step S1260, the wireless device receives the duplicated DL data from the N3IWF of the first network via the NG-RAN of the second network based on the third PDU session.

In some implementations, the first network may be a PLMN, and the second network may be a SNPN. Or, the first network may be a SNPN, and the second network may be a PLMN.

In some implementations, the wireless device may be in communication with at least one of a mobile device, a network, and/or autonomous vehicles other than the wireless device.

Furthermore, the method in perspective of the wireless device described above in FIG. 12 may be performed by the first wireless device 100 shown in FIG. 2, the wireless device 100 shown in FIG. 3, and/or the UE 100 shown in FIG. 4.

More specifically, the wireless device comprises at least one transceiver, at least one processor, and at least one computer memory operably connectable to the at least one processor and storing instructions that, based on being executed by the at least one processor, perform operations below.

The operations comprise performing a first PDU session establishment procedure with a first network to establish a first PDU session via a NG-RAN of the first network.

The operations comprise performing second PDU session establishment procedure with the first network to establish a second PDU session via a N3IWF of the first network. DL data is duplicated in a UPF of the first network and sent to both the NG-RAN of the first network and the N3IWF of the first network.

In some implementations, the second PDU session establishment procedure may comprise transmitting a PDU Session Establishment Request message which includes 1) a PDU session ID of an on-going PDU session via the NG-RAN of the first network, and 2) a request type set to handover preparation between the first network and a second network.

The operations comprise receiving the duplicated DL data from the NG-RAN of the first network based on the first PDU session.

The operations comprise moving to a second network from the first network.

The operations comprise performing a third PDU session establishment procedure with the second network to establish a third PDU session via a NG-RAN of the second network.

The operations comprise receiving the duplicated DL data from the N3IWF of the first network via the NG-RAN of the second network based on the third PDU session.

The operations comprise transmitting, to the N3IWF of the first network, 1) a path switch indication informing that the wireless device moves to the second network from the first network, and 2) a NG-RAN context release indication to trigger UE context release procedure to release resources in the NG-RAN of the first network.

In some implementations, 1) the path switch indication and 2 the NG-RAN context release indication may be transmitted via a MOBIKE update address message. A MOBIKE address verification message may be received from the N3IWF of the first network in response to the MOBIKE update address message.

In some implementations, the first network may be a PLMN, and the second network may be a SNPN. Or, the first network may be a SNPN, and the second network may be a PLMN.

In some implementations, the wireless device may be in communication with at least one of a mobile device, a network, and/or autonomous vehicles other than the wireless device.

Furthermore, the method in perspective of the wireless device described above in FIG. 12 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system (e.g., wireless device) comprises at least one processor, and at least one computer memory operably connectable to the at least one processor. The at least one processor is configured to perform operations comprising: performing a first PDU session establishment procedure with a first network to establish a first PDU session via a NG-RAN of the first network, performing a second PDU session establishment procedure with the first network to establish a second PDU session via a N3IWF of the first network, wherein DL data is duplicated in a UPF of the first network and sent to both the NG-RAN of the first network and the N3IWF of the first network, obtaining the duplicated DL data based on the first PDU session, performing a third PDU session establishment procedure with the second network to establish a third PDU session via a NG-RAN of the second network, obtaining the duplicated DL data based on the third PDU session, and generating 1) a path switch indication informing that the wireless device moves to a second network from the first network, and 2) a NG-RAN context release indication to trigger UE context release procedure to release resources in the NG-RAN of the first network.

Furthermore, the method in perspective of the wireless device described above in FIG. 12 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: performing a first PDU session establishment procedure with a first network to establish a first PDU session via a NG-RAN of the first network, performing a second PDU session establishment procedure with the first network to establish a second PDU session via a N3IWF of the first network, wherein DL data is duplicated in a UPF of the first network and sent to both the NG-RAN of the first network and the N3IWF of the first network, obtaining the duplicated DL data based on the first PDU session, performing a third PDU session establishment procedure with the second network to establish a third PDU session via a NG-RAN of the second network, obtaining the duplicated DL data based on the third PDU session, and generating 1) a path switch indication informing that the wireless device moves to a second network from the first network, and 2) a NG-RAN context release indication to trigger UE context release procedure to release resources in the NG-RAN of the first network.

According to implementations described in FIGS. 11 and 12, by creating a backup UP connection in advance in case the wireless device moves between SNPN and PLMN, the process required to handover PDU sessions that used to provide VIAPA services can be reduced. Therefore, VIAPA services can be quickly provided to users, and it can be prevented from disrupting the user experience.

Hereinafter, various implementations/embodiments of the present disclosure are described.

1. Embodiment 1

According to embodiment 1 of the present disclosure, in order to support the service continuity for handover between the PLMN and SNPN, the SMF may request to the UPF to duplicate (and/or replicate) the DL data and send the duplicated DL data to the NG-RAN and N3IWF. The N3IWF may just buffer the received DL data. When the UE accesses to the N3IWF via other network, the buffered DL data may be delivered to the UE.

The procedure to be described below by referring to FIGS. 13 to 17 may be applied to support the service continuity for handover from the PLMN NG-RAN to the SNPN NG-RAN. The procedure may also be applied to support the service continuity for handover from the SNPN NG-RAN to the PLMN NG-RAN.

Figure 13:
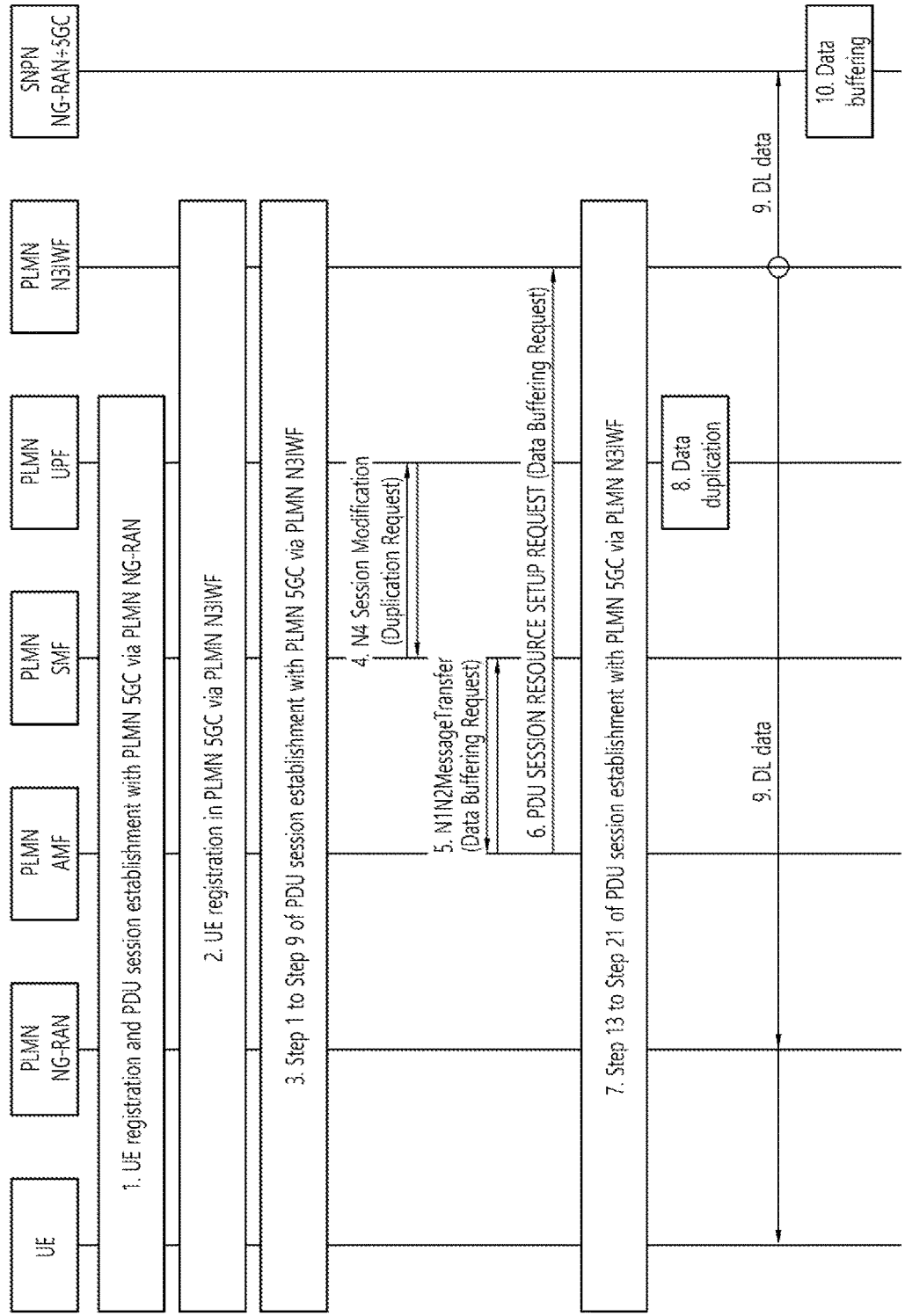
FIGS. 13 and 14 show an example of a procedure for duplicated transmission to NG-RAN and N3IWF based on control plane to which implementations of the present disclosure is applied.
Figure 14:
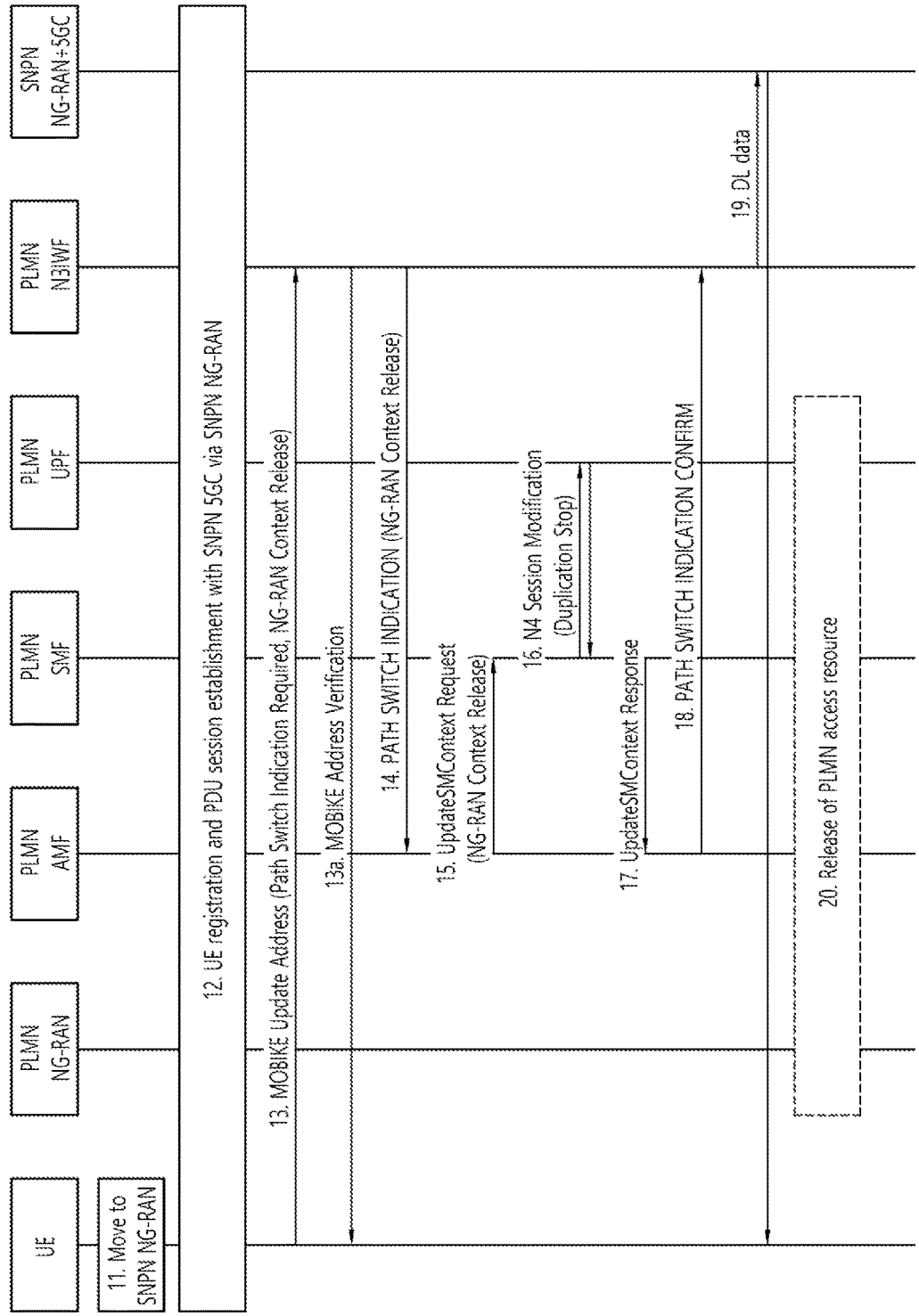

FIGS. 13 and 14 show an example of a procedure for duplicated transmission to NG-RAN and N3IWF based on control plane to which implementations of the present disclosure is applied.

First, the operations of FIG. 13 are described.

(1) Step 1: The UE registers in the PLMN via the PLMN NG-RAN according to the registration procedure described above in FIGS. 6 and 7. The UE establishes a PDU session via the PLMN NG-RAN according to the PDU Session Establishment procedure described above in FIGS. 8 and 9 to receive PLMN services.

(2) Step 2: In order to support service continuity between the PLMN and SNPN, the UE also performs registration to the PLMN via the PLMN N3IWF, according to the registration procedure described above in FIGS. 6 and 7, with the 5G-GUTI which was given to the UE when registering with the PLMN in step 1.

(3) Step 3: The UE performs steps 1-9 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

In this step, the UE may transmit the PDU Session Establishment Request message containing the PDU session ID of the on-going PDU session via the PLMN NG-RAN and the Request Type set to "Handover preparation between PLMN and SNPN" if the request refers to an existing PDU session handover between PLMN and SNPN. This information may enable the PLMN SMF to maintain both PDU sessions via the PLMN NG-RAN and the PLMN N3IWF, to continuously send the DL data via the PLMN NG-RAN, and not to trigger the UE context release procedure to release the resources in the PLMN NG-RAN. When the PLMN AMF received the PDU Session Establishment Request message with the Request Type set to "Handover preparation between PLMN and SNPN", the PLMN AMF may route the PDU Session Establishment Request message to the PLMN SMF that is associated with the PDU session ID the UE provided.

(4) Step 4: The PLMN SMF initiates an N4 Session Modification procedure with the selected the PLMN UPF. The PLMN SMF may send an N4 Session Modification Request message to the PLMN UPF and provide Packet detection, enforcement and reporting rules to be installed on the PLMN UPF for this PDU Session. The duplication request indication may also be included in the N4 Session Modification Request message to indicate the PLMN UPF to duplicate/replicate the DL data and send the duplicated DL data to the PLMN NG-RAN and the PLMN N3IWF.

Then, the PLMN UPF acknowledges by sending an N4 Session Modification Response message.

(5) Step 5: The PLMN SMF provides to the PLMN AMF the N2 SM information containing the data buffering request indication by using the Namf_Communication_N1N2MessageTransfer message.

(6) Step 6: The PLMN AMF forwards the N2 SM information containing the data buffering request indication to the PLMN N3IWF by using the PDU Session Resource Setup Request message. The data buffering request indication may indicate the PLMN N3IWF to buffer the duplicated DL data.

(7) Step 7: The UE performs steps 13-21 of the PDU Session Establishment procedure described above in FIGS. 8 and 9. For the PDU Session Establishment via untrusted non-3GPP access procedure, Section 4.21.5 of 3GPP TS 23.502 may be further referred.

(8) Step 8: The PLMN UPF duplicates the DL data and assigns the same GTP-U sequence number to them.

(9) Step 9: The PLMN UPF sends the duplicated DL data to the PLMN NG-RAN and the PLMN N3IWF. The PLMN NG-RAN just forwards the received duplicated DL data to the UE.

(10) Step 10: The PLMN N3IWF buffers the received duplicated DL data.

To improve the efficiency of the duplication, a timer may be configured in the PLMN N3IWF by the PLMN SMF (i.e., NGAP signaling) or the PLMN UPF (i.e., user plane). When the timer expires, the buffered DL data may be discarded.

Next, the operations of FIG. 14 which follow the operations of FIG. 13 are described.

(11) Step 11: The UE detects need to move to the SNPN NG-RAN from the PLMN NG-RAN.

(12) Step 12: The UE registers in the SNPN via the SNPN NG-RAN according to the registration procedure described above in FIGS. 6 and 7. The UE establishes a PDU session via the SNPN NG-RAN according to the PDU Session Establishment procedure described above in FIGS. 8 and 9 to receive SNPN services.

(13) Step 13: For option 1, the UE may initiate IPSec tunnel update procedure by sending the MOBIKE update address message. The UE may include the Path Switch Indication Required indication to trigger the Path Switch Indication procedure and/or Path Switch procedure and/or PDU Session Resource Modify procedure in step 14. From the Path Switch Indication procedure, the PLMN SMF can be notified of the UE mobility from the PLMN NG-RAN to the SNPN NG-RAN. In this step, the UE may also include the NG-RAN Context Release indication to trigger the UE context release procedure to release the resources in the PLMN NG-RAN.

For option 2, the UE may initiate IPsec tunnel update procedure by sending the MOBIKE update address message. After MOBIKE procedure is finished, the UE may send PDU Session Modification Request message including path switching indication. In this case, step 14 and step 18 may be skipped and the PDU Session Modification Request message may be sent to the PLMN SMF in step 15.

(13a) Step 13a: The PLMN N3IWF sends MOBIKE Address Verification message to the UE.

(14) Step 14: For option 1, upon reception of the Path Switch Indication Required indication, the PLMN N3IWF initiates the Path Switch Indication procedure and/or Path Switch Procedure and/or PDU Session Resource Modify procedure to the PLMN AMF to indicate that the UE accesses to the PLMN N3IWF via the SNPN NG-RAN.

If the NG-RAN Context Release indication is included in step 13, the PLMN N3IWF may also forwards the NG-RAN Context Release indication to the PLMN AMF.

Even if the explicit Path Switch Indication Required indication from the UE is not received in this step, the PLMN N3IWF may be able to execute the Path Switch Indication procedure based on the data buffering request indication received in step 6 and/or the MOBIKE Update Address message received in step 13.

(15) Step 15: The PLMN AMF sends the Nsmf_PDUSession_UpdateSMContext Request message to indicate the PLMN SMF that the UE accesses to the PLMN N3IWF via the SNPN NG-RAN. If the NG-RAN Context Release indication is included in step 14, the PLMN AMF may also forward the NG-RAN Context Release indication to the PLMN SMF.

(16) Step 16: If the NG-RAN Context Release indication is included in step 15, the PLMN SMF sends the N4 Session Modification Request message with the duplication stop indication which indicates the PLMN UPF to stop the DL data duplication. Based on the duplication stop indication, the PLMN UPF may send the DL data only to the PLMN N3IWF. Then, the PLMN UPF acknowledges by sending an N4 Session Modification Response message.

If the NG-RAN Context Release indication is not included in step 15, the PLMN SMF may decide to continue the DL data duplication. Since the DL data is sent to the UE via the PLMN N3IWF from this moment, the PLMN SMF may need to indicate the PLMN NG-RAN to buffer the duplicated DL data as in steps 4~6. Until the UE comes back to the PLMN NG-RAN due to mobility from the SNPN NG-RAN to the PLMN NG-RAN, the DL data may be buffered in the PLMN NG-RAN as in steps 8~10. In this case, the step 20 may be skipped.

(17) Step 17: The PLMN SMF responses with the Nsmf_PDUSession_UpdateSMContext Response message.

In order to allow the PLMN N3IWF to initiate the DL data delivery, the explicit data delivery request indication may be included into the Nsmf_PDUSession_UpdateSMContext Response message.

(18) Step 18: For option 1, the PLMN AMF may send the Path Switch Indication Confirm message and/or Path Switch Acknowledge message and/or PDU Session Resource Modify Response message to the PLMN N3IWF.

In order to avoid unnecessary transmission of successfully delivered DL data, the PLMN SMF may request to the PLMN NG-RAN to report the sequence number of DL data that was successfully delivered towards the UE, and then forward this information to the PLMN N3IWF. Based on this information, the PLMN N3IWF may only retransmit the remaining DL data and new packets to the UE.

For option 2, the PLMN SMF may send the PDU Session Modification Command message to the UE in order to confirm UE's request.

(19) Step 19: The PLMN N3IWF sends the DL data to the UE. If the NG-RAN Context Release indication is not included in step 13, the duplicated DL data may also be sent to the PLMN NG-RAN. Then, it may be buffered in the PLMN NG-RAN.

When the PLMN N3IWF is aware that the UE moves to the SNPN NG-RAN in step 13, the PLMN N3IWF may initiate the DL data transmission without explicit indication in step 17.

(20) Step 20: If the NG-RAN Context Release indication is included in step 13, the PLMN SMF executes the release of resource in the PLMN according to Section 4.3.4.2 of 3GPP TS 23.502 in order to release the resources over the PLMN via the PLMN NG-RAN.

If the NG-RAN Context Release indication is not included in step 13, this step may be skipped.

Figure 15:
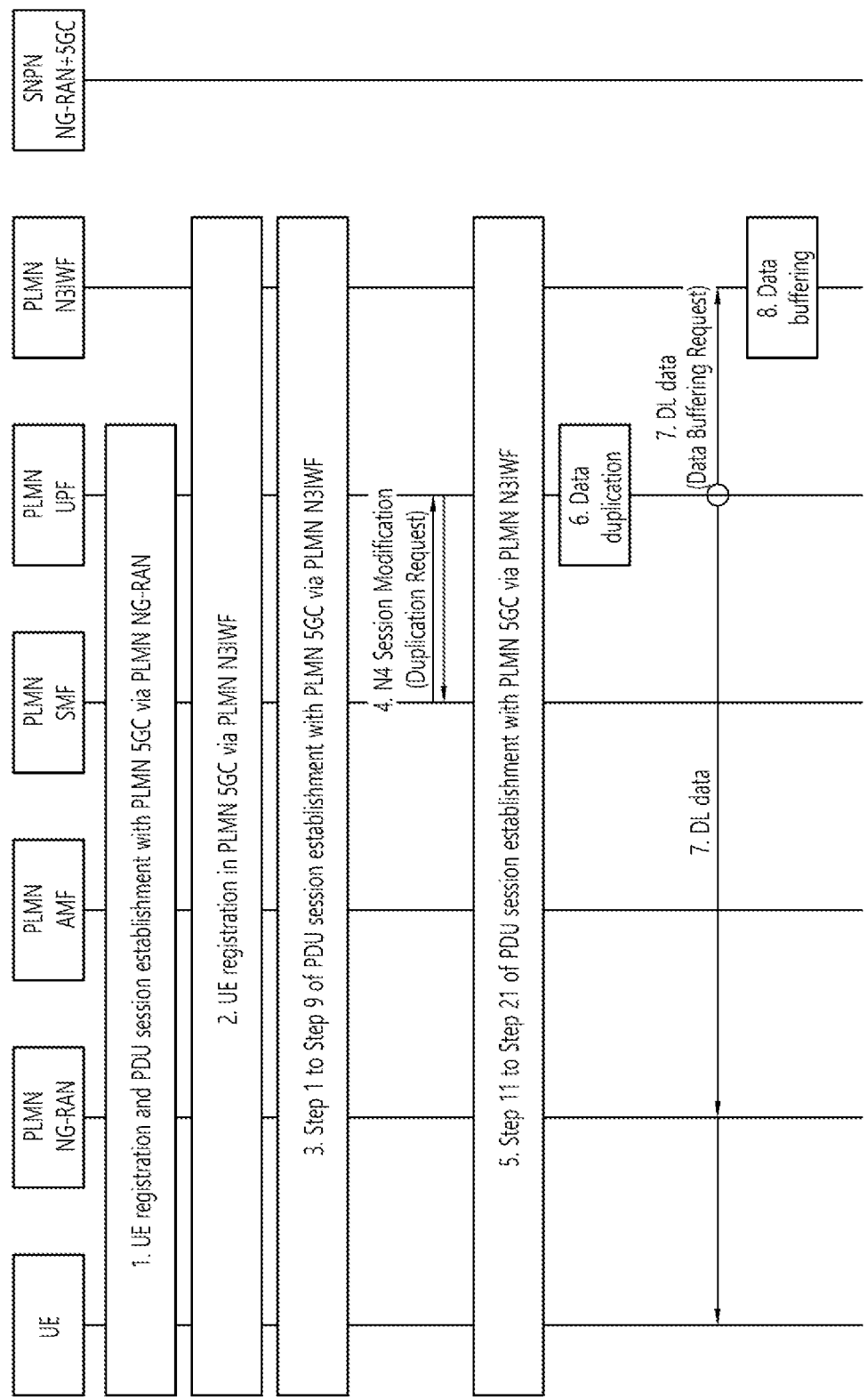
FIGS. 15 and 16 show an example of a procedure for duplicated transmission to NG-RAN and N3IWF based on user plane to which implementations of the present disclosure is applied.
Figure 16:
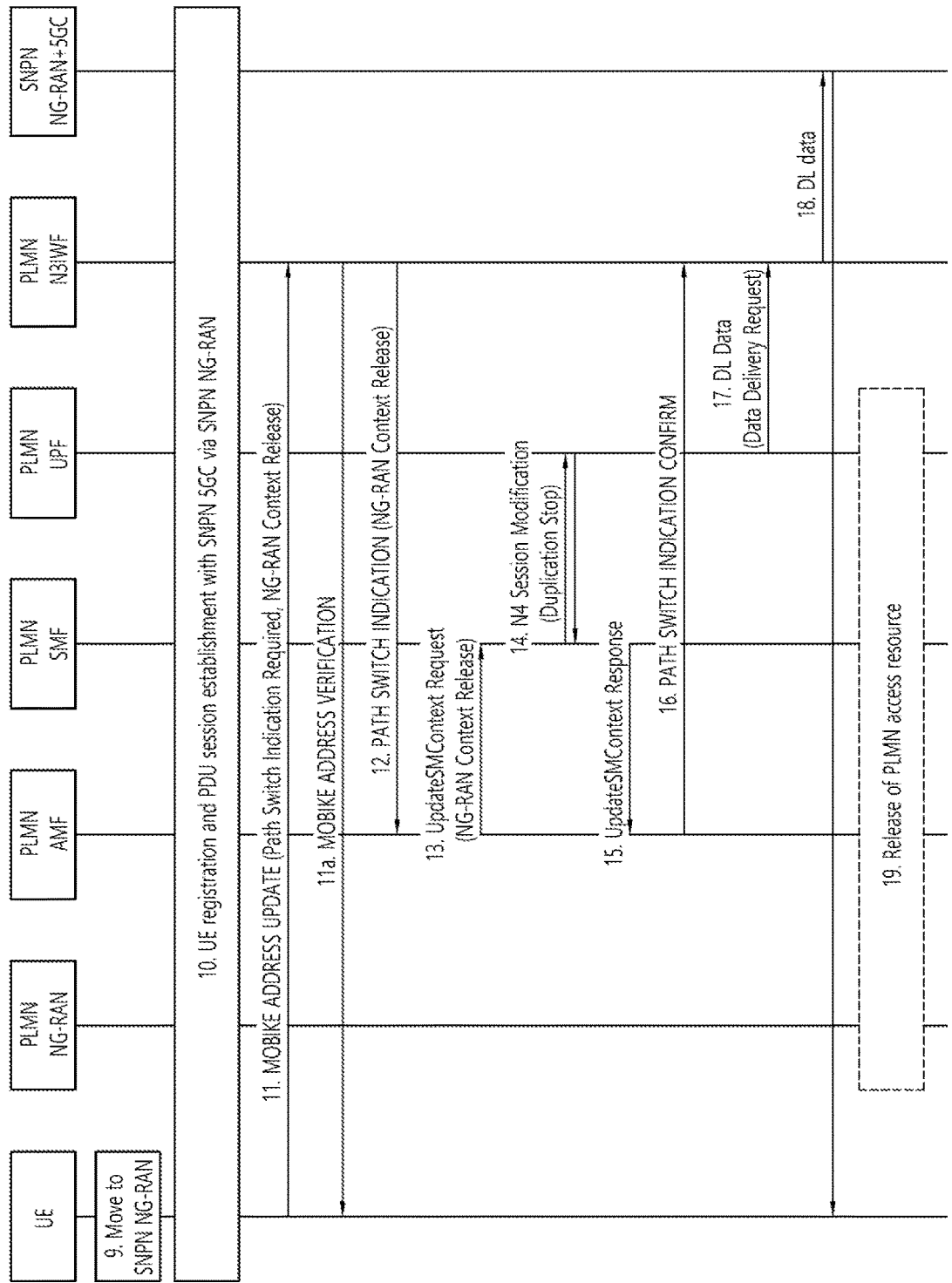

FIGS. 15 and 16 show an example of a procedure for duplicated transmission to NG-RAN and N3IWF based on user plane to which implementations of the present disclosure is applied.

First, the operations of FIG. 15 are described.

(1) Step 1: The UE registers in the PLMN via the PLMN NG-RAN according to the registration procedure described above in FIGS. 6 and 7. The UE establishes a PDU session via the PLMN NG-RAN according to the PDU Session Establishment procedure described above in FIGS. 8 and 9 to receive PLMN services.

(2) Step 2: In order to support service continuity between the PLMN and SNPN, the UE also performs registration to the PLMN via the PLMN N3IWF, according to the registration procedure described above in FIGS. 6 and 7, with the 5G-GUTI which was given to the UE when registering with the PLMN in step 1.

(3) Step 3: The UE performs steps 1-9 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

In this step, the UE may transmit the PDU Session Establishment Request message containing the PDU session ID of the on-going PDU session via the PLMN NG-RAN and the Request Type set to "Handover preparation between PLMN and SNPN" if the request refers to an existing PDU session handover between PLMN and SNPN. This information may enable the PLMN SMF to maintain both PDU sessions via the PLMN NG-RAN and the PLMN N3IWF, to continuously send the DL data via the PLMN NG-RAN, and not to trigger the UE context release procedure to release the resources in the PLMN NG-RAN. When the PLMN AMF received the PDU Session Establishment Request message with the Request Type set to "Handover preparation between PLMN and SNPN", the PLMN AMF may route the PDU Session Establishment Request message to the PLMN SMF that is associated with the PDU session ID the UE provided.

(4) Step 4: The PLMN SMF initiates an N4 Session Modification procedure with the selected the PLMN UPF. The PLMN SMF may send an N4 Session Modification Request message to the PLMN UPF and provide Packet detection, enforcement and reporting rules to be installed on the PLMN UPF for this PDU Session. The duplication request indication may also be included in the N4 Session Modification Request message to indicate the PLMN UPF to duplicate/replicate the DL data and send the duplicated DL data to the PLMN NG-RAN and the PLMN N3IWF.

Then, the PLMN UPF acknowledges by sending an N4 Session Modification Response message.

(5) Step 5: The UE performs steps 11-21 of the PDU Session Establishment procedure described above in FIGS. 8 and 9. For the PDU Session Establishment via untrusted non-3GPP access procedure, Section 4.21.5 of 3GPP TS 23.502 may be further referred.

(6) Step 6: The PLMN UPF duplicates the DL data and assigns the same GTP-U sequence number to them.

(7) Step 7: The PLMN UPF sends the duplicated DL data to the PLMN NG-RAN and the PLMN N3IWF. The PLMN NG-RAN just forwards the received duplicated DL data to the UE.

The PLMN UPF may include the data buffering request indication into the DL PDU Session Information frame of the DL data. The data buffering request indication may be provided to indicate the PLMN N3IWF to buffer the duplicated DL data.

To improve the efficiency of the duplication, a timer may be configured in the PLMN N3IWF by the PLMN SMF (i.e., NGAP signaling) or the PLMN UPF (i.e., user plane). When the timer expires, the buffered DL data may be discarded.

(8) Step 8: The PLMN N3IWF buffers the received duplicated DL data.

Next, the operations of FIG. 16 which follow the operations of FIG. 15 are described.

(9) Step 9: The UE detects need to move to the SNPN NG-RAN from the PLMN NG-RAN.

(10) Step 10: The UE registers in the SNPN via the SNPN NG-RAN according to the registration procedure described above in FIGS. 6 and 7. The UE establishes a PDU session via the SNPN NG-RAN according to the PDU Session Establishment procedure described above in FIGS. 8 and 9 to receive SNPN services.

(11) Step 11: For option 1, the UE may initiate IPSec tunnel update procedure by sending the MOBIKE update address message. The UE may include the Path Switch Indication Required indication to trigger the Path Switch Indication procedure and/or Path Switch procedure and/or PDU Session Resource Modify procedure in step 12. From the Path Switch Indication procedure, the PLMN SMF can be notified of the UE mobility from the PLMN NG-RAN to the SNPN NG-RAN. In this step, the UE may also include the NG-RAN Context Release indication to trigger the UE context release procedure to release the resources in the PLMN NG-RAN.

For option 2, the UE may initiate IPsec tunnel update procedure by sending the MOBIKE update address message. After MOBIKE procedure is finished, the UE may send PDU Session Modification Request message including path switching indication. In this case, step 12 and step 16 may be skipped and the PDU Session Modification Request message may be sent to the PLMN SMF in step 13.

(11a) Step 11a: The PLMN N3IWF sends MOBIKE Address Verification message to the UE.

(12) Step 12: For option 1, upon reception of the Path Switch Indication Required indication, the PLMN N3IWF initiates the Path Switch Indication procedure and/or Path Switch Procedure and/or PDU Session Resource Modify procedure to the PLMN AMF to indicate that the UE accesses to the PLMN N3IWF via the SNPN NG-RAN.

If the NG-RAN Context Release indication is included in step 11, the PLMN N3IWF may also forwards the NG-RAN Context Release indication to the PLMN AMF.

Even if the explicit Path Switch Indication Required indication from the UE is not received in this step, the PLMN N3IWF may be able to execute the Path Switch Indication procedure based on the data buffering request indication received in step 7 and/or the MOBIKE Update Address message received in step 11.

(13) Step 13: The PLMN AMF sends the Nsmf_PDUSession_UpdateSMContext Request message to indicate the PLMN SMF that the UE accesses to the PLMN N3IWF via the SNPN NG-RAN. If the NG-RAN Context Release indication is included in step 12, the PLMN AMF may also forward the NG-RAN Context Release indication to the PLMN SMF.

(14) Step 14: If the NG-RAN Context Release indication is included in step 13, the PLMN SMF sends the N4 Session Modification Request message with the duplication stop indication which indicates the PLMN UPF to stop the DL data duplication. Based on the duplication stop indication, the PLMN UPF may send the DL data only to the PLMN N3IWF. Then, the PLMN UPF acknowledges by sending an N4 Session Modification Response message.

If the NG-RAN Context Release indication is not included in step 13, the PLMN SMF may decide to continue the DL data duplication. Since the DL data is sent to the UE via the PLMN N3IWF from this moment, the PLMN SMF may need to indicate the PLMN NG-RAN to buffer the duplicated DL data as in steps 6~8. Until the UE comes back to the PLMN NG-RAN due to mobility from the SNPN NG-RAN to the PLMN NG-RAN, the DL data may be buffered in the PLMN NG-RAN as in steps 6~8. In this case, the step 19 may be skipped.

(15) Step 15: The PLMN SMF responses with the Nsmf_PDUSession_UpdateSMContext Response message.

(16) Step 16: For option 1, the PLMN AMF may send the Path Switch Indication Confirm message and/or Path Switch Acknowledge message and/or PDU Session Resource Modify Response message to the PLMN N3IWF.

In order to avoid unnecessary transmission of successfully delivered DL data, the PLMN SMF may request to the PLMN NG-RAN to report the sequence number of DL data that was successfully delivered towards the UE, and then forward this information to the PLMN N3IWF. Based on this information, the PLMN N3IWF may only retransmit the remaining DL data and new packets to the UE.

For option 2, the PLMN SMF may send the PDU Session Modification Command message to the UE in order to confirm UE's request.

(17) Step 17: The PLMN UPF sends the DL data with the DL PDU Session Information frame including the data delivery request indication, which is used to allow the PLMN N3IWF to initiate the DL data delivery.

If the NG-RAN Context Release indication is not included in step 11, the duplicated DL data may also be sent to the PLMN NG-RAN. Then, it may be buffered in the PLMN NG-RAN.

(18) Step 18: The PLMN N3IWF sends the DL data to the UE.

When the PLMN N3IWF is aware that the UE moves to the SNPN NG-RAN in step 11, the PLMN N3IWF may initiate the DL data transmission without explicit indication in step 17.

(19) Step 19: If the NG-RAN Context Release indication is included in step 11, the PLMN SMF executes the release of resource in the PLMN according to Section 4.3.4.2 of 3GPP TS 23.502 in order to release the resources over the PLMN via the PLMN NG-RAN.

If the NG-RAN Context Release indication is not included in step 11, this step may be skipped.

Figure 17:
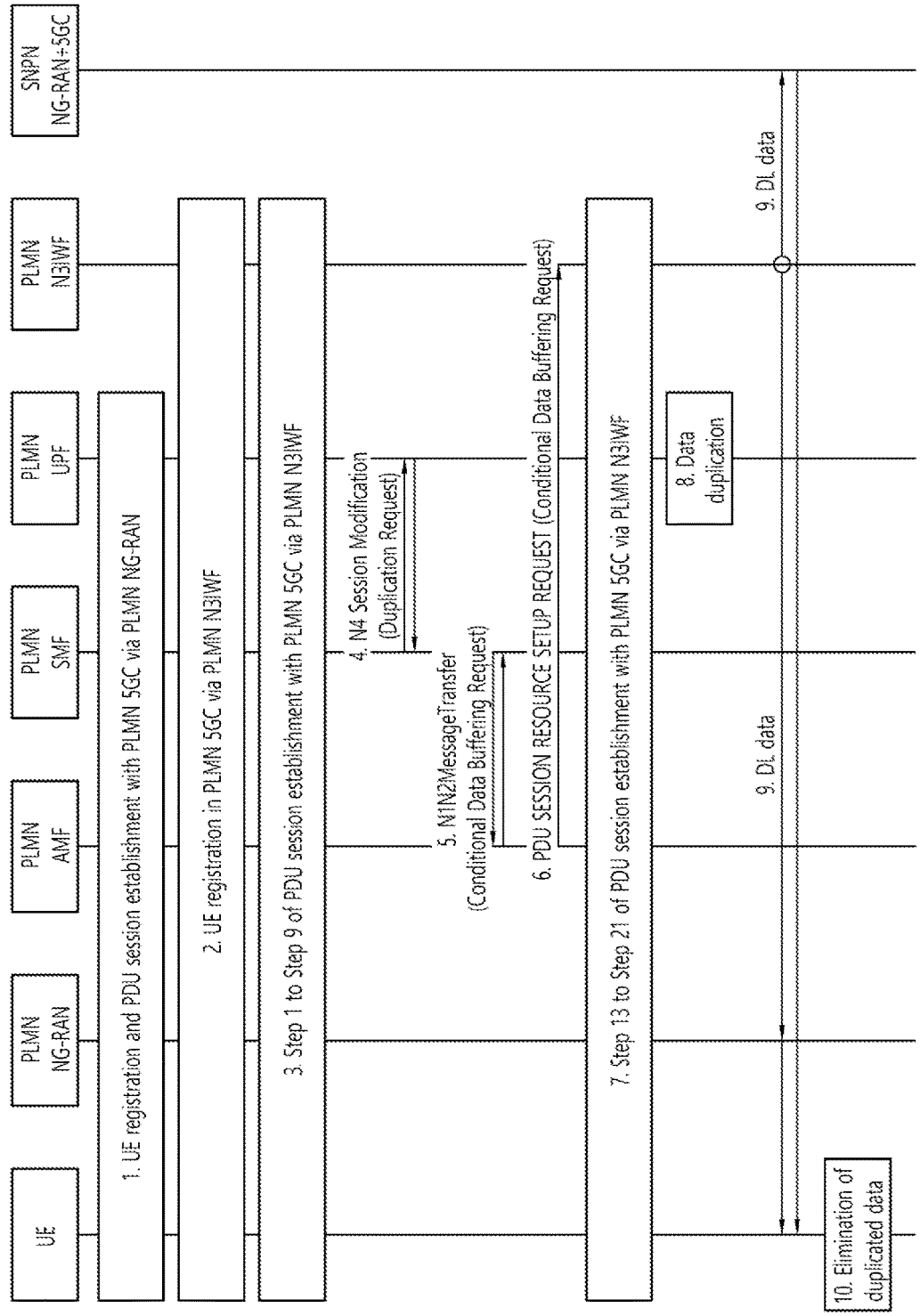
FIG. 17 shows an example of a procedure for redundant transmission to NG-RAN and N3IWF to which implementations of the present disclosure is applied.

FIG. 17 shows an example of a procedure for redundant transmission to NG-RAN and N3IWF to which implementations of the present disclosure is applied.

(1) Step 1: The UE registers in the PLMN via the PLMN NG-RAN according to the registration procedure described above in FIGS. 6 and 7. The UE establishes a PDU session via the PLMN NG-RAN according to the PDU Session Establishment procedure described above in FIGS. 8 and 9 to receive PLMN services.

(2) Step 2: In order to support service continuity between the PLMN and SNPN, the UE also performs registration to the PLMN via the PLMN N3IWF, according to the registration procedure described above in FIGS. 6 and 7, with the 5G-GUTI which was given to the UE when registering with the PLMN in step 1.

(3) Step 3: The UE performs steps 1-9 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

In this step, the UE may transmit the PDU Session Establishment Request message containing the PDU session ID of the on-going PDU session via the PLMN NG-RAN and the Request Type set to "Handover preparation between PLMN and SNPN" if the request refers to an existing PDU session handover between PLMN and SNPN. This information may enable the PLMN SMF to maintain both PDU sessions via the PLMN NG-RAN and the PLMN N3IWF, to continuously send the DL data via the PLMN NG-RAN, and not to trigger the UE context release procedure to release the resources in the PLMN NG-RAN. When the PLMN AMF received the PDU Session Establishment Request message with the Request Type set to "Handover preparation between PLMN and SNPN", the PLMN AMF may route the PDU Session Establishment Request message to the PLMN SMF that is associated with the PDU session ID the UE provided.

(4) Step 4: The PLMN SMF initiates an N4 Session Modification procedure with the selected the PLMN UPF. The PLMN SMF may send an N4 Session Modification Request message to the PLMN UPF and provide Packet detection, enforcement and reporting rules to be installed on the PLMN UPF for this PDU Session. The duplication request indication may also be included in the N4 Session Modification Request message to indicate the PLMN UPF to duplicate/replicate the DL data and send the duplicated DL data to the PLMN NG-RAN and the PLMN N3IWF.

Then, the PLMN UPF acknowledges by sending an N4 Session Modification Response message.

The user's subscription may indicate if user is allowed to support service continuity for handover between PLMN and SNPN and to have redundant PDU Sessions. This indication may be provided to the PLMN SMF from the PLMN UDM. It may also be possible for the UE to request the service continuity for handover between PLMN and SNPN in step 3 and to indicate the PLMN SMF that the UE supports duplication and elimination of redundant data over the duplicate paths. Based on the UE request and/or the indication from the PLMN UDM, the PLMN SMF may decide to duplicate the DL data, and then inform the PLMN UPF of its decision.

(5) Step 5: The PLMN SMF provides to the PLMN AMF the N2 SM information containing the conditional data buffering request indication by using the Namf_Communication_N1N2MessageTransfer message.

(6) Step 6: The PLMN AMF forwards the N2 SM information containing the conditional data buffering request indication to the PLMN N3IWF by using the PDU Session Resource Setup Request message. The conditional data buffering request indication may be provided to indicate that if the DL data is not successfully delivered to the UE, the PLMN N3IWF should buffer the duplicated DL data instead of discarding it. When the UE re-accesses to the PLMN N3IWF via the SNPN NG-RAN, the buffered DL data may be sent to the UE.

(7) Step 7: The UE performs steps 13-21 of the PDU Session Establishment procedure described above in FIGS. 8 and 9. For the PDU Session Establishment via untrusted non-3GPP access procedure, Section 4.21.5 of 3GPP TS 23.502 may be further referred.

(8) Step 8: The PLMN UPF duplicates the DL data and assigns the same GTP-U sequence number to them.

(9) Step 9: The PLMN UPF sends the duplicated DL data to the PLMN NG-RAN and the PLMN N3IWF. Both the PLMN NG-RAN and the PLMN N3IWF forward the duplicated DL data to the UE.

(10) Step 10: The UE eliminates the duplicated DL data received from the PLMN NG-RAN and the PLMN N3IWF, respectively.

It may be assumed that in the UE, the upper layer protocol, such as the IEEE time sensitive networking (TSN) frame replication and elimination for reliability (FRER) is located to eliminate the duplicated DL data.

To improve the efficiency of the duplication, a timer may be configured in the PLMN N3IWF by the PLMN SMF (i.e., NGAP signaling) or the PLMN UPF (i.e., user plane). When the timer expires, the PLMN N3IWF may discard the buffered DL data, and then notify the PLMN SMF of the data discard.

Next, the operations of FIG. 14, i.e., steps 11-20, may be performed following the operations of FIG. 17. It may be possible for the PLMN UPF to buffer the duplicated DL data as described in FIGS. 13 to 16.

According to embodiment 1 of the present disclosure, since there is no setup for indirect data forwarding tunnel, the DL data can be delivered to the UE quickly. In order to prepare the subsequent handover from the SNPN NG-RAN to the PLMN NG-RAN, based on the UE request, the PLMN SMF can reserve the resource in the PLMN NG-RAN instead of releasing it.

2. Embodiment 2

According to embodiment 2 of the present disclosure, in order to support the service continuity for handover between the PLMN and SNPN, the SMF may request to the UPF to duplicate (and/or replicate) the DL data and store the duplicated DL Data until the duplicated DL data is successfully delivered via the NG-RAN. When the UE accesses to the N3IWF via other network, the UPF may forward the duplicated DL data to the UE via the N3IWF.

The procedure to be described below by referring to FIGS. 18 to 20 may be applied to support the service continuity for handover from the PLMN NG-RAN to the SNPN NG-RAN. The procedure may also be applied to support the service continuity for handover from the SNPN NG-RAN to the PLMN NG-RAN.

Figure 18:
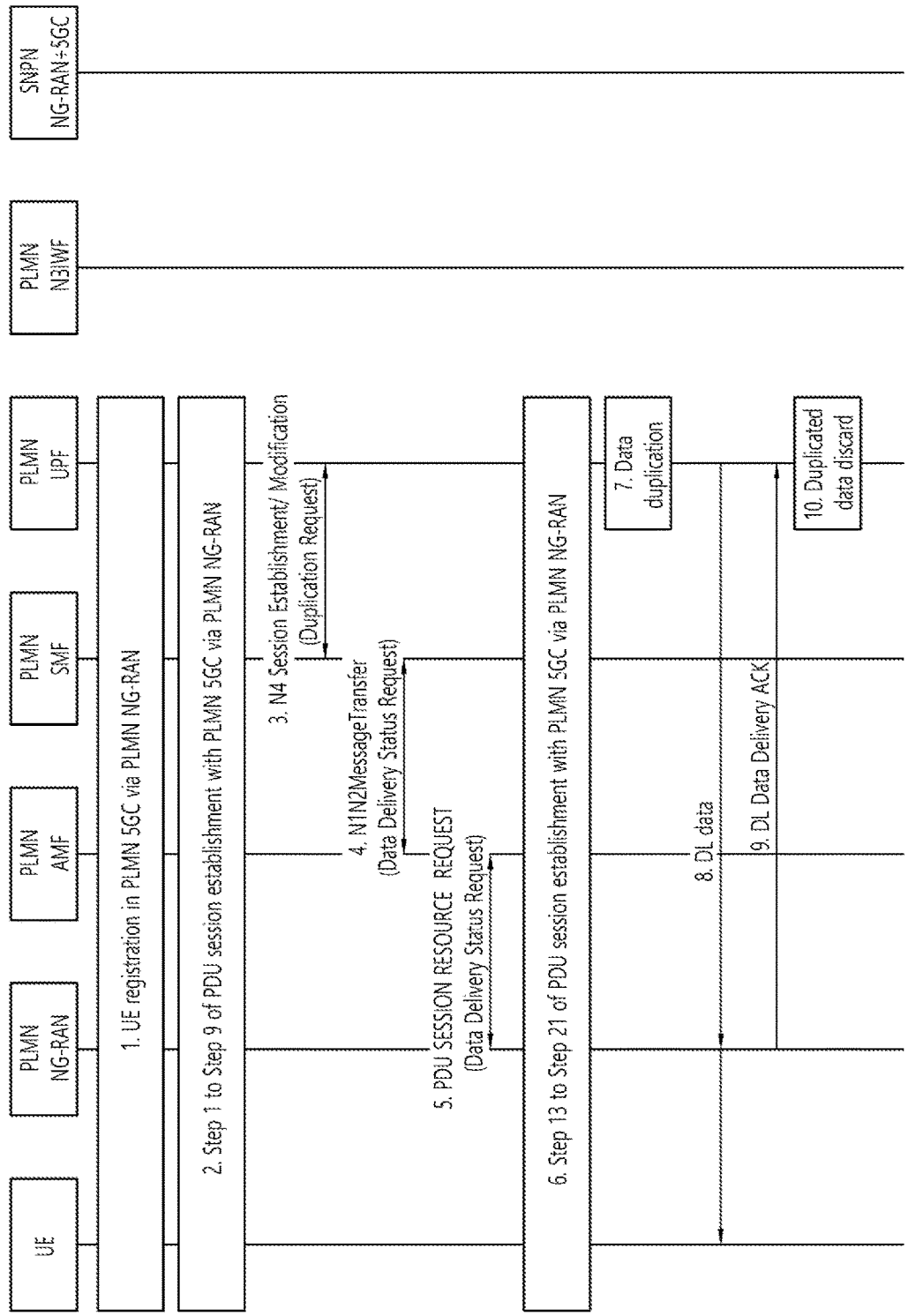
FIGS. 18 and 19 show an example of a procedure for UPF buffering the duplicated DL data without PDU session establishment via N3IWF before handover to which implementations of the present disclosure is applied.
Figure 19:
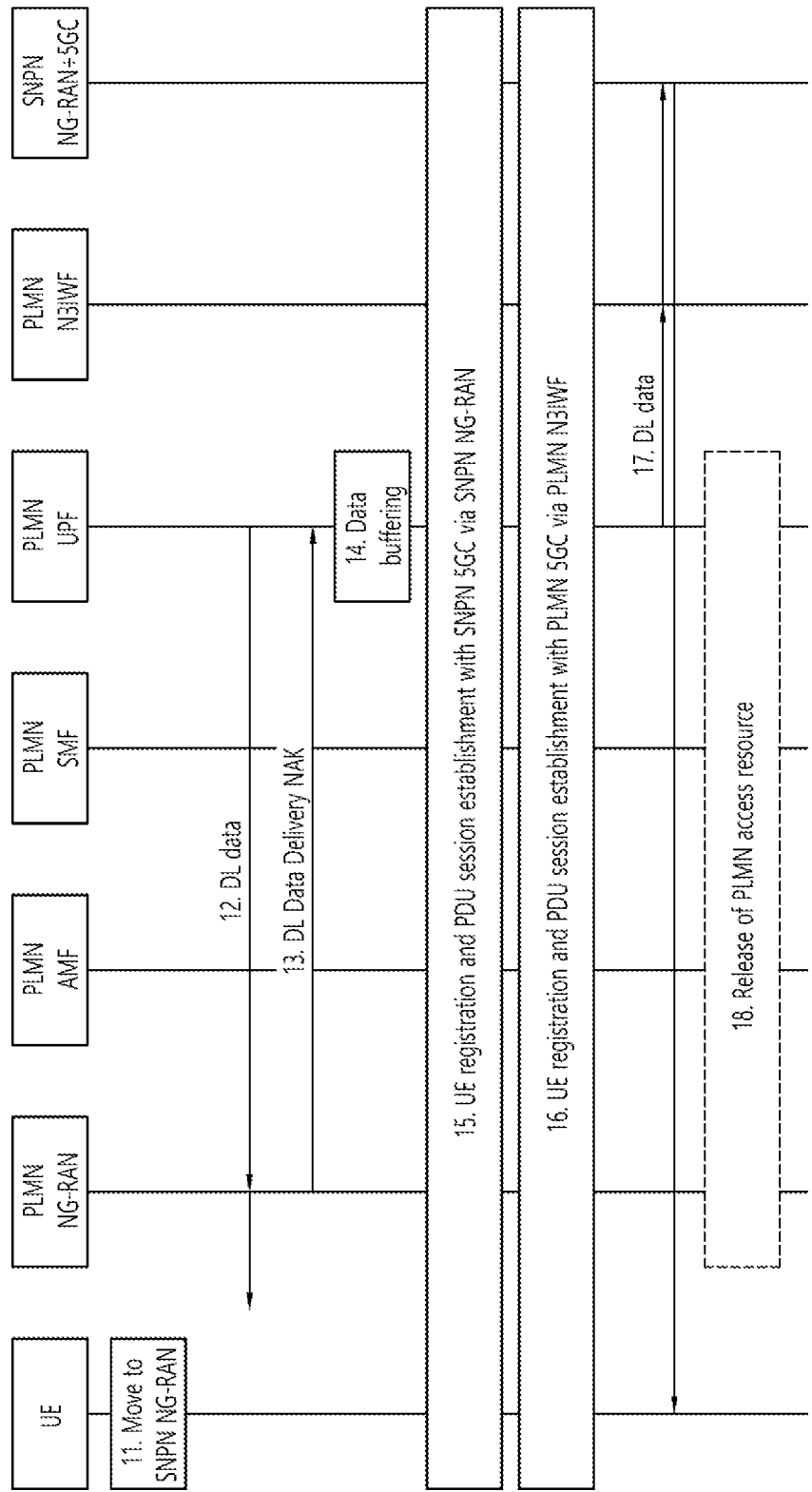

FIGS. 18 and 19 show an example of a procedure for UPF buffering the duplicated DL data without PDU session establishment via N3IWF before handover to which implementations of the present disclosure is applied.

First, the operations of FIG. 18 are described.

(1) Step 1: The UE registers in the PLMN via the PLMN NG-RAN according to the registration procedure described above in FIGS. 6 and 7.

(2) Step 2: The UE performs steps 1-9 of the PDU Session Establishment procedure described above in FIGS. 8 and 9 to establish PDU session(s) with the PLMN via the PLMN NG-RAN.

(3) Step 3: The PLMN SMF initiates an N4 Session Establishment/Modification procedure with the selected the PLMN UPF. The PLMN SMF may send an N4 Session Establishment/Modification Request message to the PLMN UPF and provide Packet detection, enforcement and reporting rules to be installed on the PLMN UPF for this PDU Session. The duplication request indication may also be included in the N4 Session Establishment/Modification Request message to indicate the PLMN UPF to duplicate/replicate the DL data and send the duplicated DL data to the PLMN NG-RAN and the PLMN N3IWF.

Then, the PLMN UPF acknowledges by sending an N4 Session Establishment/Modification Response message.

The user's subscription may indicate if user is allowed to support service continuity for handover between PLMN and SNPN. This indication may be provided to the PLMN SMF from the PLMN UDM. It may also be possible for the UE to request the service continuity for handover between PLMN and SNPN in step 2. Based on the UE request and/or the indication from the PLMN UDM, the PLMN SMF may decide to duplicate the DL data and indicate the PLMN NG-RAN to report whether the DL data is successfully delivered to the UE or not.

(4) Step 4: The PLMN SMF provides to the PLMN AMF the N2 SM information containing the data delivery status request indication by using the Namf_Communication_N1N2MessageTransfer message.

(5) Step 5: The PLMN AMF forwards the N2 SM information containing the data delivery status request indication to the PLMN NG-RAN by using the PDU Session Resource Setup Request message. The data delivery status request indication may be provided to indicate the PLMN NG-RAN to report whether the DL data is successfully delivered to the UE or not.

(6) Step 6: The UE performs steps 13-21 of the PDU Session Establishment procedure described above in FIGS. 8 and 9.

(7) Step 7: The PLMN UPF duplicates the DL data and assigns the same GTP-U sequence number to them.

(8) Step 8: The PLMN UPF sends the duplicated DL data to the PLMN NG-RAN. The PLMN NG-RAN just forwards the duplicated DL data to the UE. The PLMN UPF also stores the duplicated DL data.

(9) Step 9: The PLMN NG-RAN reports to the PLMN UPF whether the duplicated DL data was successfully delivered.

To improve the efficiency of the duplication, a timer may be configured by the PLMN SMF (i.e., NGAP signaling) or the PLMN UPF (i.e., user plane). When the timer expires, the duplicated DL data may be discarded.

In order to avoid unnecessary transmission of successfully delivered DL data, the PLMN SMF may request to the PLMN NG-RAN to report the sequence number of DL data that was successfully delivered towards the UE in steps 4-5. In this case, the PLMN NG-RAN may also report the sequence number of DL data that was successfully delivered in step 9. Based on this information, the PLMN UPF may only retransmit the remaining DL data and new packets to the UE.

The PLMN NG-RAN can perform reporting to the PLMN UPF via the PLMN SMF (i.e., via NG and N4 interface).

(10) Step 10: Upon receiving the delivery status of the duplicated DL data in step 9 (i.e., ACK), the PLMN UPF discards the duplicated DL data that was successfully delivered.

Next, the operations of FIG. 19 which follow the operations of FIG. 18 are described.

(11) Step 11: The UE detects need to move to the SNPN NG-RAN from the PLMN NG-RAN.

(12) Step 12: The PLMN UPF still sends the duplicated DL data to the UE via the PLMN NG-RAN. However, the PLMN NG-RAN fails to deliver the duplicated DL data due to the UE mobility.

(13) Step 13: The PLMN NG-RAN reports to the PLMN UPF that it failed to deliver the duplicated DL data to the UE.

(14) Step 14: Upon receiving the delivery status of the duplicated DL data in step 13 (i.e., NACK), the PLMN UPF stores the duplicated DL data that was unsuccessfully delivered.

(15) Step 15: The UE registers in the SNPN via the SNPN NG-RAN according to the registration procedure described above in FIGS. 6 and 7. The UE establishes a PDU session via the SNPN NG-RAN according to the PDU Session Establishment procedure described above in FIGS. 8 and 9 to receive SNPN services.

(16) Step 16: The UE also performs registration to the PLMN via the PLMN N3IWF, according to the registration procedure described above in FIGS. 6 and 7, with the 5G-GUTI which was given to the UE when registering with the PLMN in step 1.

In order to support service continuity between the PLMN and SNPN, the UE establishes a PDU session via the PLMN N3IWF according to the PDU Session Establishment procedure described above in FIGS. 8 and 9. For the PDU Session Establishment via untrusted non-3GPP access procedure, Section 4.21.5 of 3GPP TS 23.502 may be further referred.

In this step, the UE may transmit the PDU Session Establishment Request message containing the PDU session ID of the on-going PDU session via the PLMN NG-RAN and the Request Type set to "Existing PDU session". This information may enable the PLMN SMF to maintain both PDU sessions via the PLMN NG-RAN and the PLMN N3IWF, to switch the user plane path from the PLMN NG-RAN to the PLMN N3IWF. From this moment, the DL data may be sent to the UE via the PLMN N3IWF.

If the PLMN SMF decides to keep the resource in PLMN NG-RAN to prepare the handover from the SNPN NG-RAN to PLMN NG-RAN, the UE context release procedure to release the resources in the PLMN NG-RAN may not be triggered. Therefore, step 18 may be skipped. Also, the PLMN SMF may need to indicate the PLMN N3IWF to report whether the duplicated DL data is successfully delivered to the UE or not as in steps 4-5.

If the PLMN SMF decides not to keep the resource in PLMN NG-RAN, the PLMN SMF may trigger the UE Context Release procedure in step 18.

The UE may indicate the PLMN SMF to release the resource in PLMN NG-RAN.

(17) Step 17: The PLMN UPF sends the duplicated DL data, which was unsuccessfully delivered in the PLMN NG-RAN, to the UE via the PLMN N3IWF, SNPN 5GC and SNPN NG-RAN.

(18) Step 18: If the PLMN SMF decides to keep the resource in PLMN NG-RAN, this step is skipped.

If the PLMN SMF decides not to keep the resource in PLMN NG-RAN, the PLMN SMF executes the release of resource in the PLMN according to Section 4.3.4.2 of 3GPP TS 23.502 in order to release the resources over the PLMN via the PLMN NG-RAN.

Figure 20:
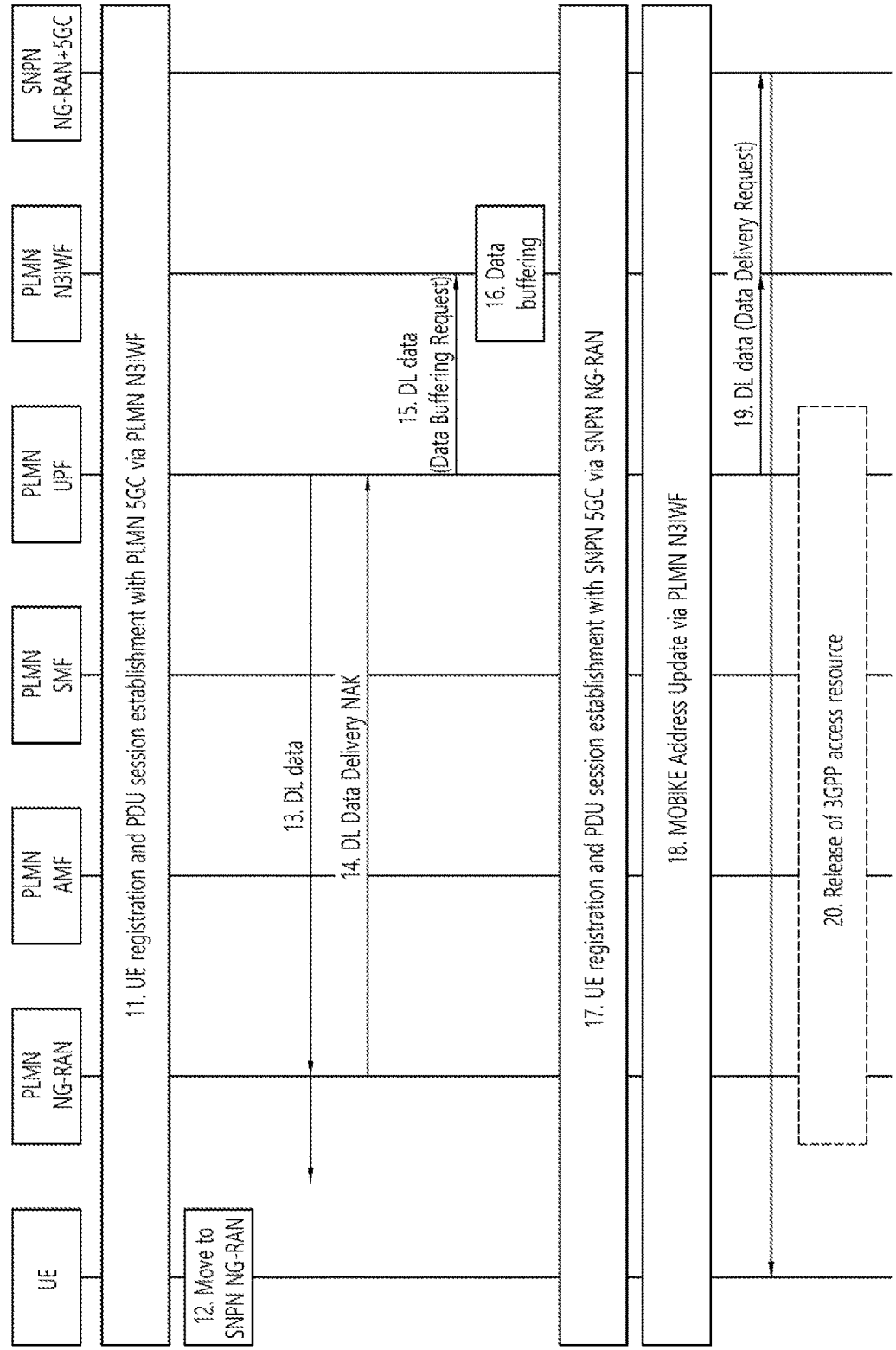
FIG. 20 shows an example of a procedure for UPF buffering the duplicated DL data considering PDU session establishment via N3IWF before handover to which implementations of the present disclosure is applied.

FIG. 20 shows an example of a procedure for UPF buffering the duplicated DL data considering PDU session establishment via N3IWF before handover to which implementations of the present disclosure is applied.

Before the operations of FIG. 20 are performed, the operations of FIG. 18, i.e., steps 1-10, are performed first.

(11) Step 11: The UE performs registration to the PLMN via the PLMN N3IWF, according to the registration procedure described above in FIGS. 6 and 7, with the 5G-GUTI which was given to the UE when registering with the PLMN in step 1.

In order to support service continuity between the PLMN and SNPN, the UE establishes a PDU session via the PLMN N3IWF according to the PDU Session Establishment procedure described above in FIGS. 8 and 9. For the PDU Session Establishment via untrusted non-3GPP access procedure, Section 4.21.5 of 3GPP TS 23.502 may be further referred.

In this step, the UE may transmit the PDU Session Establishment Request message containing the PDU session ID of the on-going PDU session via the PLMN NG-RAN and the Request Type set to "Handover preparation between PLMN and SNPN" if the request refers to an existing PDU session handover between PLMN and SNPN. This information may enable the PLMN SMF to maintain both PDU sessions via the PLMN NG-RAN and the PLMN N3IWF, to continuously send the DL data via the PLMN NG-RAN, and not to trigger the UE context release procedure to release the resources in the PLMN NG-RAN. When the PLMN AMF received the PDU Session Establishment Request message with the Request Type set to "Handover preparation between PLMN and SNPN", the PLMN AMF may route the PDU Session Establishment Request message to the PLMN SMF that is associated with the PDU session ID the UE provided.

In this step, the PLMN UPF may update the UP path towards the PLMN N3IWF instead of the PLMN NG-RAN. In this case, the PLMN SMF may request to the PLMN UPF and the PLMN N3IWF to allocate information for the indirect forwarding, which will be described below. Then, the PLMN NG-RAN may use the information for the indirect forwarding to forward to the PLMN N3IWF the DL data that was not delivered yet.

After step 11, the PLMN SMF may initiate the PDU Session Modify procedure to the PLMN NG-RAN to request the report on whether the duplicated DL data is successfully delivered to the UE or not. In this case, the Request type from the UE may initiate the duplication procedure.

(12) Step 12: The UE detects need to move to the SNPN NG-RAN from the PLMN NG-RAN.

(13) Step 13: The PLMN UPF still sends the duplicated DL data to the UE via the PLMN NG-RAN. However, the PLMN NG-RAN fails to deliver the duplicated DL data due to the UE mobility.

(14) Step 14: The PLMN NG-RAN reports to the PLMN UPF that it failed to deliver the duplicated DL data to the UE.

(15) Step 15: Upon receiving the delivery status of the duplicated DL data in step 14 (i.e., NACK), the PLMN UPF sends to the PLMN N3IWF the duplicated DL data that was unsuccessfully delivered. The DL PDU Session Information frame of the DL data may include the data buffering request indication, which is used to indicate the PLMN N3IWF to buffer the duplicated DL data.

(16) Step 16: The PLMN N3IWF buffers the received duplicated DL data.

(17) Step 17: The UE registers in the SNPN via the SNPN NG-RAN according to the registration procedure described above in FIGS. 6 and 7. The UE establishes a PDU session via the SNPN NG-RAN according to the PDU Session Establishment procedure described above in FIGS. 8 and 9 to receive SNPN services.

(18) Step 18: For option 1, the UE may initiate IPSec tunnel update procedure by sending the MOBIKE update address message. The UE may include the Path Switch Indication Required indication to trigger the Path Switch Indication procedure and/or Path Switch procedure and/or PDU Session Resource Modify procedure. Upon receiving the Path Switch Indication Required indication, the PLMN N3IWF may initiate the Path Switch Indication procedure and/or Path Switch Procedure and/or PDU Session Resource Modify procedure to indicate the PLMN 5GC that the UE accesses to the PLMN N3IWF via the SNPN NG-RAN. From the Path Switch Indication procedure, the PLMN SMF can be notified of the UE mobility from the PLMN NG-RAN to the SNPN NG-RAN.

In this step, the UE may also include the NG-RAN Context Release indication to trigger the UE context release procedure to release the resources in the PLMN NG-RAN. In this case, the PLMN SMF may initiate the UE Context Release procedure in step 20. If the NG-RAN Context Release indication is not included, the PLMN SMF may decide to continue the DL data duplication. Since the duplicated DL data is sent to the UE via the PLMN N3IWF from this moment, the SMF may need to indicate the PLMN N3IWF to report whether the duplicated DL data is successfully delivered to the UE or not as in steps 4~5. Until the UE comes back to the PLMN NG-RAN due to mobility from the SNPN NG-RAN to PLMN NG-RAN, the duplicated DL data may be buffered in PLMN UPF as well. In this case, step 20 may be skipped.

For option 2, the UE may initiate IPsec tunnel update procedure by sending the MOBIKE update address message. After MOBIKE procedure is finished, the UE may send PDU Session Modification Request message including path switching indication and optionally the NG-RAN Context Release indication. The SMF may send the PDU Session Modification Command message to the UE in order to confirm UE's request.

(19) Step 19: The PLMN UPF sends the duplicated DL data with the DL PDU Session Information frame including the data delivery request indication, which is used to allow the PLMN N3IWF to initiate the DL data delivery.

When the PLMN N3IWF is aware that the UE moves to the SNPN NG-RAN in step 18, the PLMN N3WIF may initiate the DL data transmission without explicit indication in step 18.

(20) Step 20: If the UE decides to keep the resource in PLMN NG-RAN, this step is skipped.

If the UE decides not to keep the resource in PLMN NG-RAN, the PLMN SMF executes the release of resource in the PLMN according to Section 4.3.4.2 of 3GPP TS 23.502 in order to release the resources over the PLMN via the PLMN NG-RAN.

According to embodiment 2 of the present disclosure, since there is no setup for indirect data forwarding tunnel, the DL data can be delivered to the UE quickly. In addition, unnecessary data transmission to the N3IWF can be avoided. In order to prepare the subsequent handover from the SNPN NG-RAN to the PLMN NG-RAN, based on the UE request or the SMF's decision, the PLMN SMF can reserve the resource in PLMN NG-RAN instead of releasing it.

3. Embodiment 3

According to embodiment 3 of the present disclosure, in order to support the service continuity for handover between the PLMN and SNPN, the SMF and/or NG-RAN may request to the UPF and the N3IWF to set up the indirect data forwarding tunnel between the NG-RAN and the N3IWF.

The procedure to be described below by referring to FIGS. 21 to 26 may be applied to support the service continuity for handover from the PLMN NG-RAN to the SNPN NG-RAN. The procedure may also be applied to support the service continuity for handover from the SNPN NG-RAN to the PLMN NG-RAN.

Figure 21:
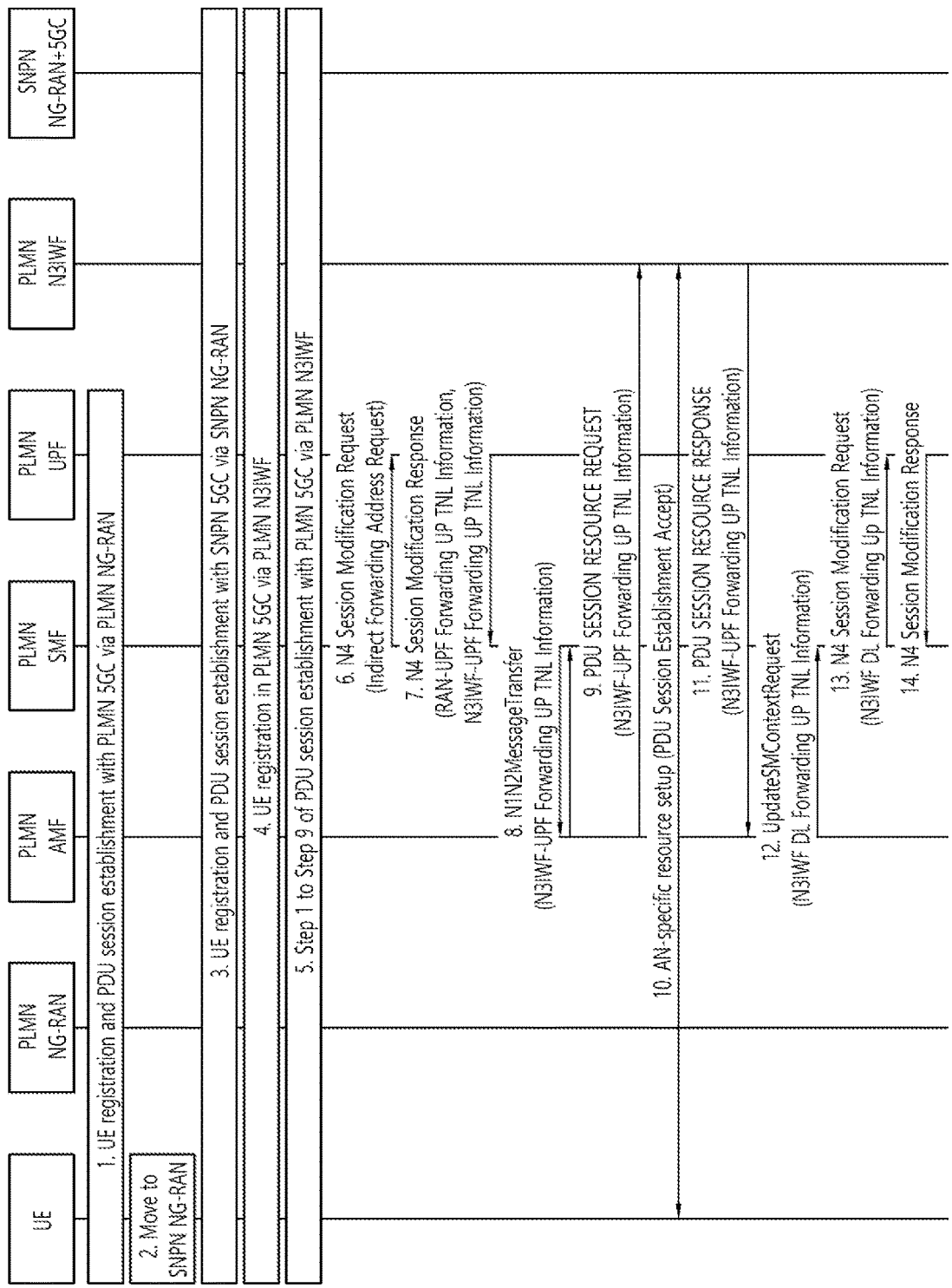
FIGS. 21 and 22 show an example of a procedure triggered by the SMF for establishment of indirect data forwarding after handover to which implementations of the present disclosure is applied.
Figure 22:
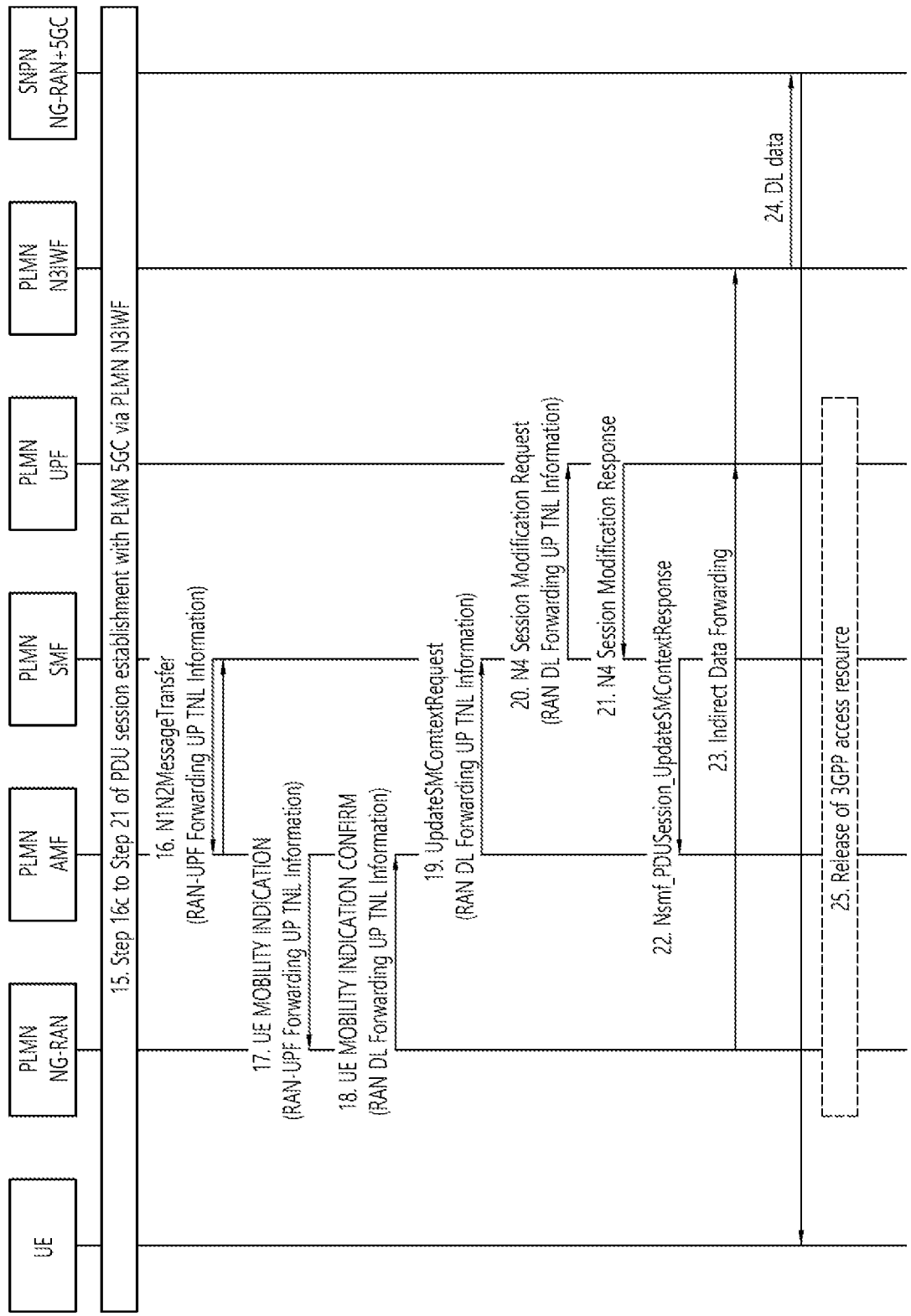

FIGS. 21 and 22 show an example of a procedure triggered by the SMF for establishment of indirect data forwarding after handover to which implementations of the present disclosure is applied.

First, the operations of FIG. 21 are described.

(1) Step 1: The UE registers in the PLMN via the PLMN NG-RAN according to the registration procedure described above in FIGS. 6 and 7. The UE establishes a PDU session via the PLMN NG-RAN according to the PDU Session Establishment procedure described above in FIGS. 8 and 9 to receive PLMN services.

(2) Step 2: The UE detects need to move to the SNPN NG-RAN from the PLMN NG-RAN.

(3) Step 3: The UE registers in the SNPN via the SNPN NG-RAN according to the registration procedure described above in FIGS. 6 and 7. The UE establishes a PDU session via the SNPN NG-RAN according to the PDU Session Establishment procedure described above in FIGS. 8 and 9 to receive SNPN services.

(4) Step 4: The UE also performs registration to the PLMN via the PLMN N3IWF, according to the registration procedure described above in FIGS. 6 and 7, with the 5G-GUTI which was given to the UE when registering with the PLMN in step 1.

(5) Step 5: The UE performs steps 1-9 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

(6) Step 6: The PLMN SMF decides to set up the indirect forwarding tunnel due to the UE mobility. Therefore, the PLMN SMF sends the N4 Session Modification Request message containing the indirect forwarding address request indication to the PLMN UPF. The indirect forwarding address request indication may be used to request to the PLMN UPF to allocate the tunnel address for the indirect data forwarding.

If the PLMN SMF decides to keep the resource in PLMN NG-RAN to prepare the handover from the SNPN NG-RAN to the PLMN NG-RAN, the PLMN SMF may not trigger the UE context release procedure to release the resources in the PLMN NG-RAN. In this case, step 25 may be skipped.

If the PLMN SMF decides not to keep the resource in PLMN NG-RAN, the PLMN SMF may trigger the UE Context Release procedure in step 25. Also, the PLMN SMF may need to indicate the PLMN UPF and the PLMN NG-RAN not to allocate the tunnel information for indirect forwarding tunnel in order to support service continuity for subsequent handover from the SNPN-NG-RAN to the PLMN NG-RAN.

The PLMN SMF may request to the PLMN UPF to allocate the tunnel address for the indirect data forwarding in step 13.

The UE may indicate the PLMN SMF to release the resource in PLMN NG-RAN.

The user's subscription may indicate if user is allowed to support service continuity for handover between PLMN and SNPN. This indication may be provided to the PLMN SMF from the PLMN UDM. It may be also possible for the UE to request the service continuity for handover between PLMN and SNPN in step 5. Based on the UE request and/or the indication from the PLMN UDM, the PLMN SMF may indicate the PLMN NG-RAN, PLMN N3IWF, and PLMN UPF to set up the indirect forwarding tunnel.

(7) Step 7: The PLMN UPF allocates the two UPF forwarding UP TNL information (i.e., RAN-UPF forwarding UP TNL information and N3IWF-UPF forwarding UP TNL information) and returns an N4 Session Modification Response message to the PLMN SMF. The RAN-UPF forwarding UP TNL information may be used to establish the indirect data forwarding tunnel between the PLMN NG-RAN and the PLMN UPF. The N3IWF-UPF forwarding UP TNL information may be used to establish the indirect data forwarding tunnel between PLMN N3IWF and PLMN UPF.

(8) Step 8: The PLMN SMF provides to the PLMN AMF the N2 SM information containing the N3IWF-UPF forwarding UP TNL information by using the Namf_Communication_N1N2MessageTransfer message.

If the PLMN SMF requests to the PLMN UPF to allocate the tunnel address for the indirect data forwarding in steps 13 and 14, the PLMN SMF may include the explicit indication (e.g., indirect forwarding address request indication) to request to the PLMN N3IWF to allocate the tunnel address for the indirect data forwarding instead of the N3IWF-UPF forwarding UP TNL information.

(9) Step 9: The PLMN AMF forwards the N2 SM information containing the N3IWF-UPF forwarding UP TNL information to the PLMN N3IWF by using the PDU Session Resource Setup Request message. Based on the N3IWF-UPF forwarding UP TNL information, the PLMN N3IWF can be aware that since the UE moves to the SNPN NG-RAN and the PDU session needs to be handed over to the PLMN N3IWF, the PLMN SMF requests to the PLMN N3IWF to allocate the tunnel address for the indirect data forwarding.

(10) Step 10: The PLMN N3IWF may issue AN specific signaling exchange with the UE that is related with the information received from the PLMN SMF.

This step may be performed after the setup of indirect forwarding tunnel between the PLMN NG-RAN and the PLMN N3IWF.

(11) Step 11: The PLMN N3IWF provides the N3IWF DL forwarding UP TNL information for each data forwarding tunnel by sending the PDU Session Resource Response message.

(12) Step 12: The PLMN AMF sends the Nsmf_PDUSession_UpdateSMContext Request message including the N2 SM information with the N3IWF DL forwarding UP TNL information.

(13) Step 13: The PLMN SMF sends the N4 Session Modification Request message containing the N3IWF DL forwarding UP TNL information to the PLMN UPF. If the indirect forwarding address request indication is not delivered in step 6, the PLMN SMF may include the indirect forwarding address request indication in this step to request to the PLMN UPF to allocate the tunnel address for the indirect data forwarding.

(14) Step 14: The PLMN UPF returns an N4 Session Modification Response message to the PLMN SMF. If the indirect forwarding address request indication is included in step 13, the PLMN UPF allocates the two UPF forwarding UP TNL information and sends it to the PLMN SMF.

(15) Step 15: The UE performs steps 16c-21 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

Next, the operations of FIG. 22 which follow the operations of FIG. 21 are described.

(16) Step 16: The PLMN SMF provides to the PLMN AMF the N2 SM information containing the RAN-UPF forwarding UP TNL information by using the Namf_Communication_N1N2MessageTransfer message.

If the PLMN SMF decides not to keep the resource in PLMN NG-RAN in step 6, the Namf_Communication_N1N2MessageTransfer message may also include the explicit indication (e.g., indirect forwarding disabled indication) to indicate the PLMN NG-RAN not to allocate the tunnel information for indirect forwarding tunnel.

(17) Step 17: The PLMN AMF forwards the N2 SM information containing the RAN-UPF forwarding UP TNL information to the PLMN NG-RAN by using the UE Mobility Indication message. Based on the received message and the RAN-UPF forwarding UP TNL information, the PLMN NG-RAN can be aware that the UE moves to the SNPN NG-RAN and the PDU session needs to be handed over to the PLMN N3IWF. If the indirect forwarding disabled indication is not received in this step, the PLMN NG-RAN may also allocate the tunnel information for indirect forwarding to support subsequent handover from the SNPN NG-RAN to the PLMN NG-RAN.

(18) Step 18: The PLMN NG-RAN responses with the UE Mobility Indication Confirm message containing the RAN DL forwarding UP TNL information.

(19) Step 19: The PLMN AMF sends the Nsmf_PDUSession_UpdateSMContext Request message including the N2 SM information with the RAN DL forwarding UP TNL information.

(20) Step 20: The PLMN SMF sends the N4 Session Modification Request message containing the RAN DL forwarding UP TNL information.

(21) Step 21: The PLMN UPF returns an N4 Session Modification Response message to the PLMN SMF.

(22) Step 22: The PLMN SMF responses with Nsmf_PDUSession_UpdateSMContext Response message.

(23) Step 23: If there is pending DL data, the PLMN NG-RAN forwards the pending DL data to the PLMN N3IWF via the PLMN UPF.

(24) Step 24: The PLMN N3IWF sends the DL data to the UE.

(25) Step 25: If the PLMN SMF decides to keep the resource in PLMN NG-RAN, this step is skipped.

If the PLMN SMF decides not to keep the resource in PLMN NG-RAN, the PLMN SMF executes the release of resource in the PLMN according to Section 4.3.4.2 of 3GPP TS 23.502 in order to release the resources over the PLMN via the PLMN NG-RAN.

Figure 23:
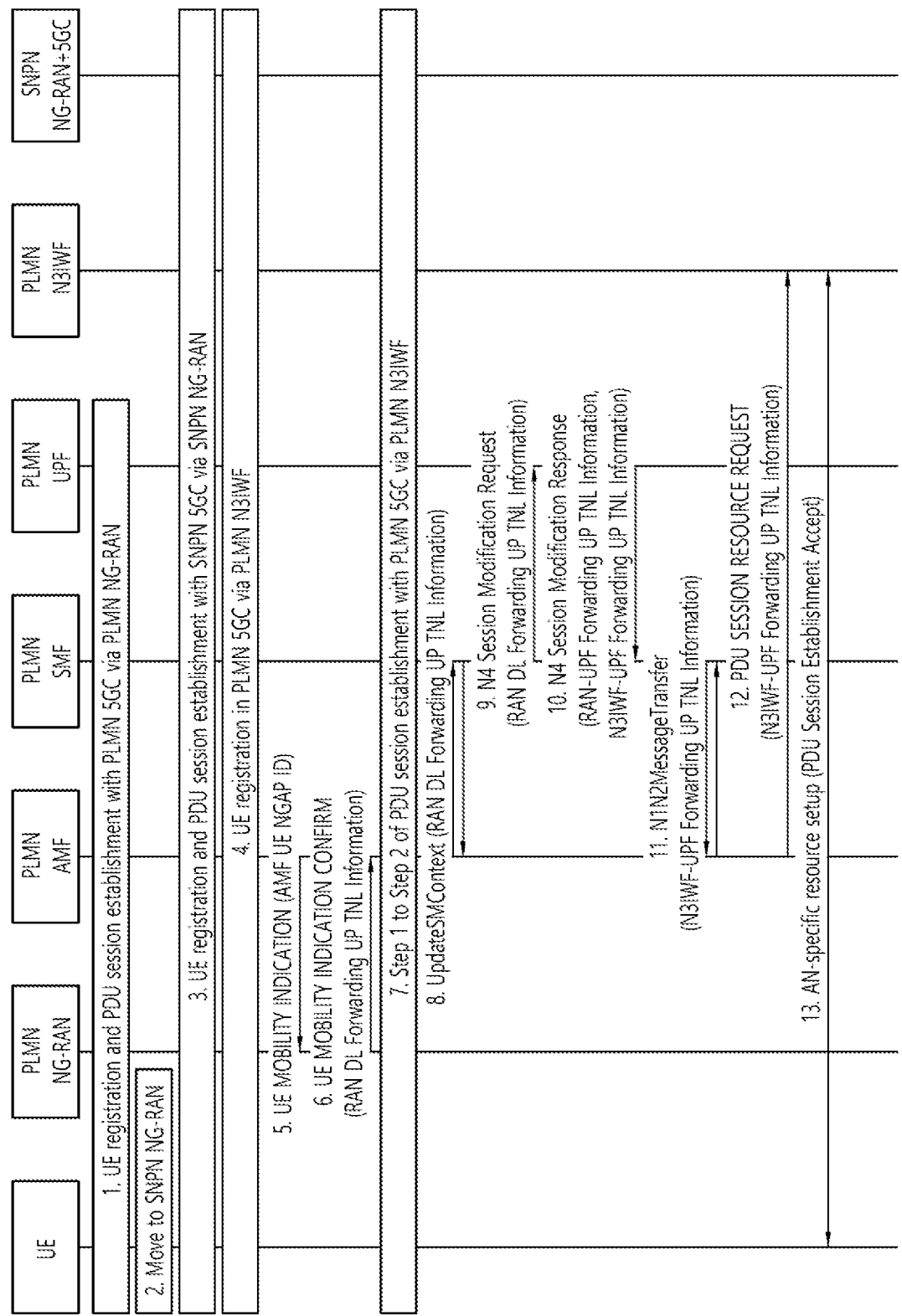
FIGS. 23 and 24 show an example of a procedure triggered by the RAN for establishment of indirect data forwarding after handover to which implementations of the present disclosure is applied.
Figure 24:
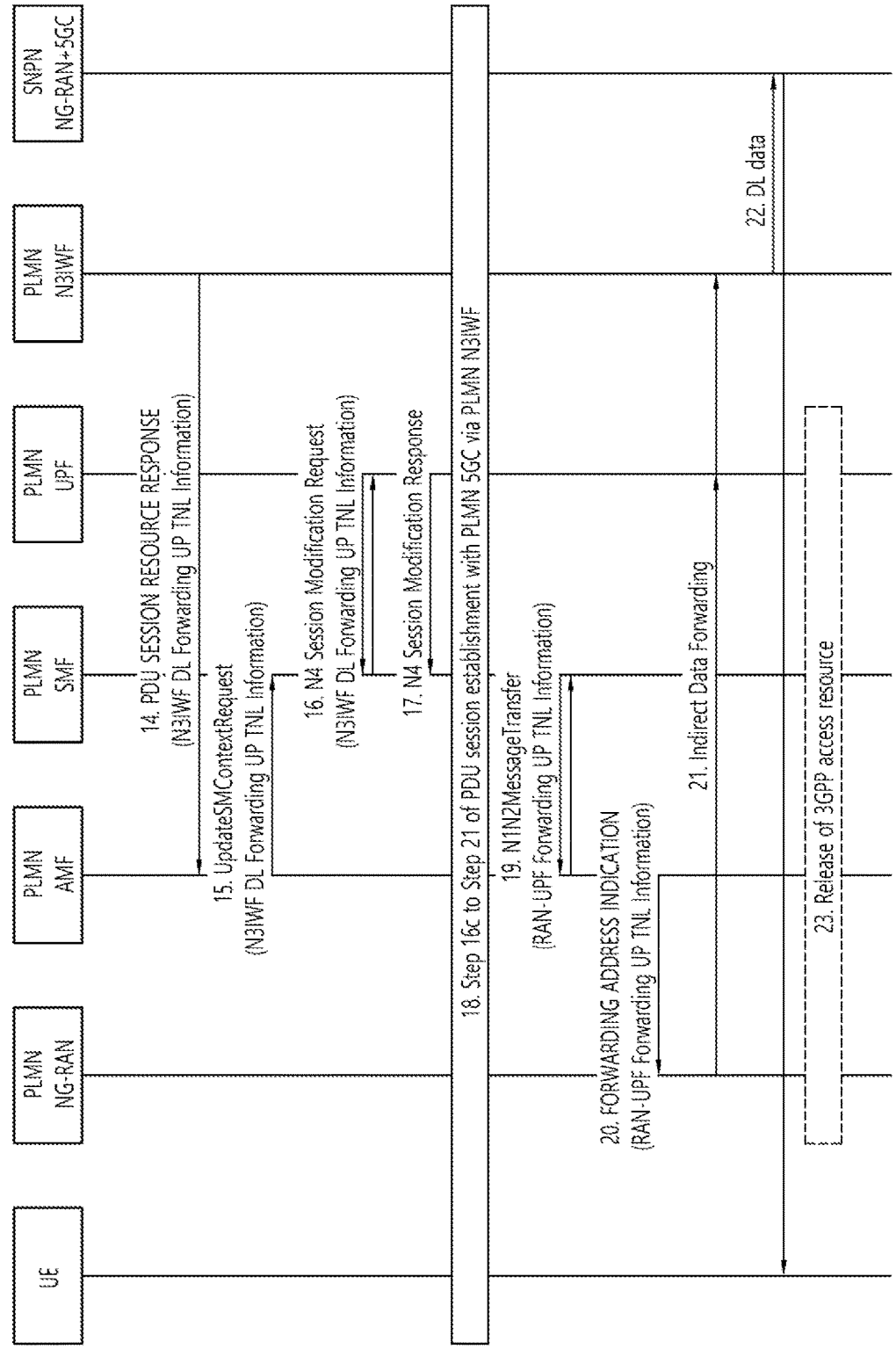

FIGS. 23 and 24 show an example of a procedure triggered by the RAN for establishment of indirect data forwarding after handover to which implementations of the present disclosure is applied.

First, the operations of FIG. 23 are described.

(1) Step 1: The UE registers in the PLMN via the PLMN NG-RAN according to the registration procedure described above in FIGS. 6 and 7. The UE establishes a PDU session via the PLMN NG-RAN according to the PDU Session Establishment procedure described above in FIGS. 8 and 9 to receive PLMN services.

(2) Step 2: The UE detects need to move to the SNPN NG-RAN from the PLMN NG-RAN.

(3) Step 3: The UE registers in the SNPN via the SNPN NG-RAN according to the registration procedure described above in FIGS. 6 and 7. The UE establishes a PDU session via the SNPN NG-RAN according to the PDU Session Establishment procedure described above in FIGS. 8 and 9 to receive SNPN services.

(4) Step 4: The UE also performs registration to the PLMN via the PLMN N3IWF, according to the registration procedure described above in FIGS. 6 and 7, with the 5G-GUTI which was given to the UE when registering with the PLMN in step 1.

(5) Step 5: Since the PLMN AMF is aware of the UE mobility, the PLMN AMF sends the UE Mobility Indication message to indicate the PLMN NG-RAN that the UE moves to the SNPN NG-RAN. To identify the UE, the AMF UE NGAP ID may be included into the UE Mobility Indication message.

(6) Step 6: The PLMN NG-RAN responses with the UE Mobility Indication Confirm message. If the NG-RAN allocates the RAN DL forwarding UP TNL information for indirect forwarding to prepare the subsequent handover from the SNPN-NG-RAN to the PLMN NG-RAN, the RN DL forwarding UP TNL information may be included in the UE Mobility Indication Confirm message. If the NG-RAN does not allocate the RAN DL forwarding UP TNL information for indirect forwarding, the UE Mobility Indication Confirm message may just include the indirect forwarding required indication to request to the PLMN N3IWF to allocate the tunnel address for indirect data forwarding.

The user's subscription may indicate if user is allowed to support service continuity for handover between PLMN and SNPN. This indication may be provided to the PLMN AMF from the PLMN UDM. Then, the PLMN AMF may forward this indication to the PLMN NG-RAN in step 5. It may be also possible for the UE to request the service continuity for handover between PLMN and SNPN in step 4. Based on the UE request and/or the indication from the PLMN UDM, the PLMN NG-RAN may indicate the PLMN SMF to set up the indirect forwarding tunnel.

(7) Step 7: The UE performs steps 1-2 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

(8) Step 8: The PLMN AMF sends the Nsmf_PDUSession_UpdateSMContext Request message including the N2 SM information with the RAN DL forwarding UP TNL information or the indirect forwarding required indication, either of which is received in step 6. If the RAN DL forwarding UP TNL information is received, the PLMN SMF may decide to keep the resource in PLMN NG-RAN to prepare the handover from the SNPN NG-RAN to the PLMN NG-RAN. Hence, the PLMN SMF may not trigger the UE context release procedure to release the resources in the PLMN NG-RAN. Therefore, step 23 may be skipped.

If the indirect forwarding required indication is received, the PLMN SMF may decide not to keep the resource in PLMN NG-RAN. Therefore, the PLMN SMF may trigger the UE Context Release procedure in step 23.

This step may be executed after step 6.

(9) Step 9: The PLMN SMF sends the N4 Session Modification Request message containing the RAN DL forwarding UP TNL information or the indirect forwarding required indication to the PLMN UPF.

(10) Step 10: If the RAN DL forwarding UP TNL information is received, the PLMN UPF may allocate the two UPF forwarding UP TNL information (i.e., RAN-UPF forwarding UP TNL information and N3IWF-UPF forwarding UP TNL information) and return an N4 Session Modification Response message to the PLMN SMF. The RAN-UPF forwarding UP TNL information may be used to establish the indirect data forwarding tunnel between the PLMN NG-RAN and the PLMN UPF. The N3IWF-UPF forwarding UP TNL information may be used to establish the indirect data forwarding tunnel between the PLMN N3IWF and the PLMN UPF.

If the indirect forwarding required indication is received, the PLMN UPF may allocate only the N3IWF-UPF forwarding UP TNL information and return an N4 Session Modification Response message to the PLMN SMF.

(11) Step 11: The PLMN SMF provides to the PLMN AMF the N2 SM information containing the N3IWF-UPF forwarding UP TNL information by using the Namf_Communication_N1N2MessageTransfer message.

(12) Step 12: The PLMN AMF forwards the N2 SM information containing the N3IWF-UPF forwarding UP TNL information to the PLMN N3IWF by using the PDU Session Resource Setup Request message. Based on the N3IWF-UPF forwarding UP TNL information, the PLMN N3IWF can be aware that since the UE moves to the SNPN NG-RAN and the PDU session needs to be handed over to the PLMN N3IWF, the PLMN SMF requests to the PLMN N3IWF to allocate the tunnel address for the indirect data forwarding.

(13) Step 13: The PLMN N3IWF may issue AN specific signaling exchange with the UE that is related with the information received from the PLMN SMF.

This step may be performed after the setup of indirect forwarding tunnel between the PLMN NG-RAN and the PLMN N3IWF.

Next, the operations of FIG. 24 which follow the operations of FIG. 23 are described.

(14) Step 14: The PLMN N3IWF provides the N3IWF DL forwarding UP TNL information for each data forwarding tunnel by sending the PDU Session Resource Response message.

(15) Step 15: The PLMN AMF sends the Nsmf_PDUSession_UpdateSMContext Request message including the N2 SM information with the N3IWF DL forwarding UP TNL information.

(16) Step 16: The PLMN SMF sends the N4 Session Modification Request message containing the N3IWF DL forwarding UP TNL information to the PLMN UPF.

(17) Step 17: The PLMN UPF returns an N4 Session Modification Response message to the PLMN SMF.

(18) Step 18: The UE performs steps 16c-21 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

(19) Step 19: The PLMN SMF provides to the PLMN AMF the N2 SM information containing the RAN-UPF forwarding UP TNL information by using the Namf_Communication_N1N2MessageTransfer message.

(20) Step 20: The PLMN AMF forwards the N2 SM information containing the RAN-UPF forwarding UP TNL information to the PLMN NG-RAN by using the Forwarding Address Indication message. Based on the received message and the RAN-UPF forwarding UP TNL information, the PLMN NG-RAN can be aware of the tunnel address for indirect data forwarding.

(21) Step 21: If there is pending DL data, the PLMN NG-RAN forwards the pending DL data to the PLMN N3IWF via the PLMN UPF.

(22) Step 22: The PLMN N3IWF sends the DL data to the UE.

(23) Step 23: If the PLMN SMF decides to keep the resource in PLMN NG-RAN, this step is skipped.

If the PLMN SMF decides not to keep the resource in PLMN NG-RAN, the PLMN SMF executes the release of resource in the PLMN according to Section 4.3.4.2 of 3GPP TS 23.502 in order to release the resources over the PLMN via the PLMN NG-RAN.

Figure 25:
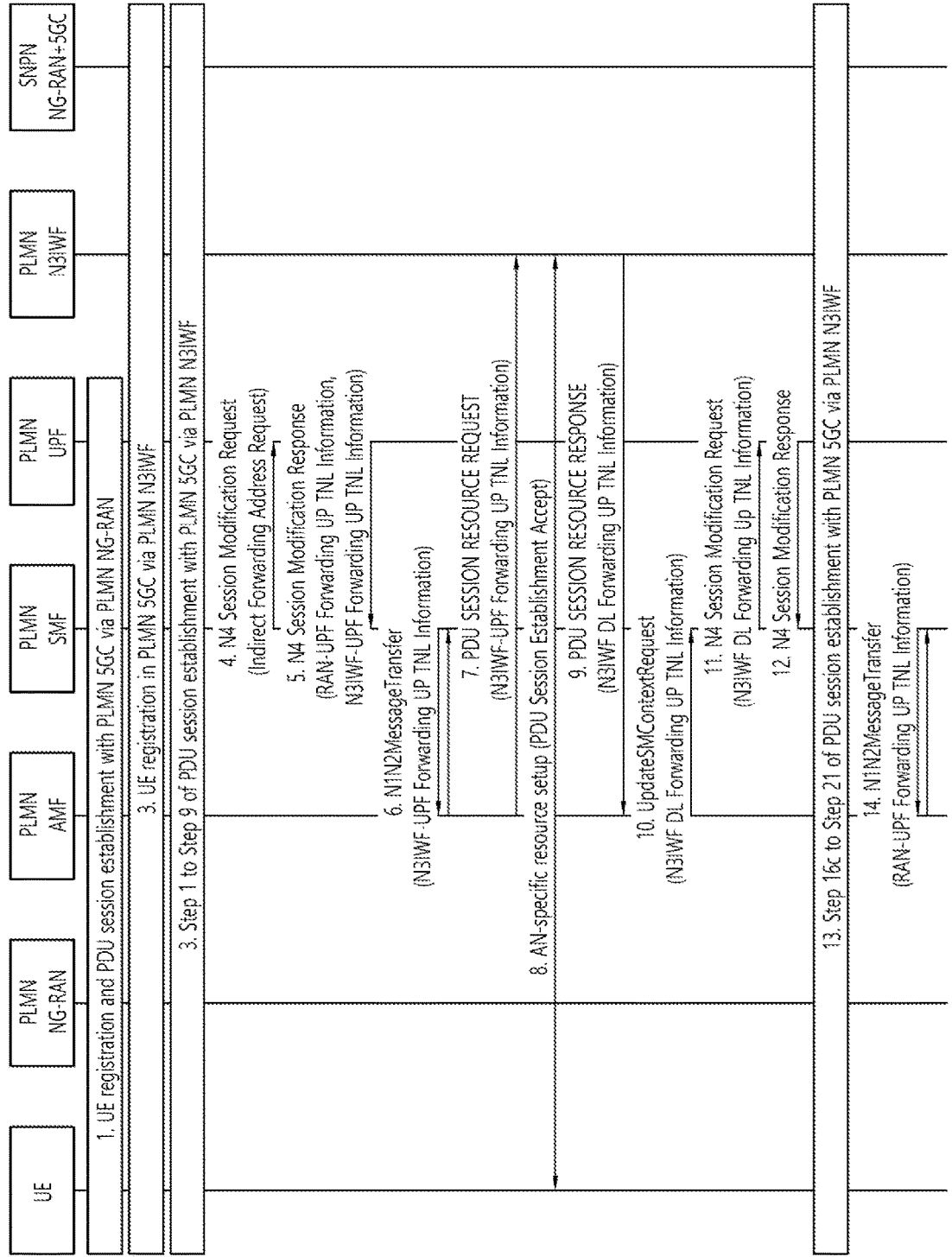
FIGS. 25 and 26 show an example of a procedure triggered by the SMF for establishment of indirect data forwarding before handover to which implementations of the present disclosure is applied.
Figure 26:
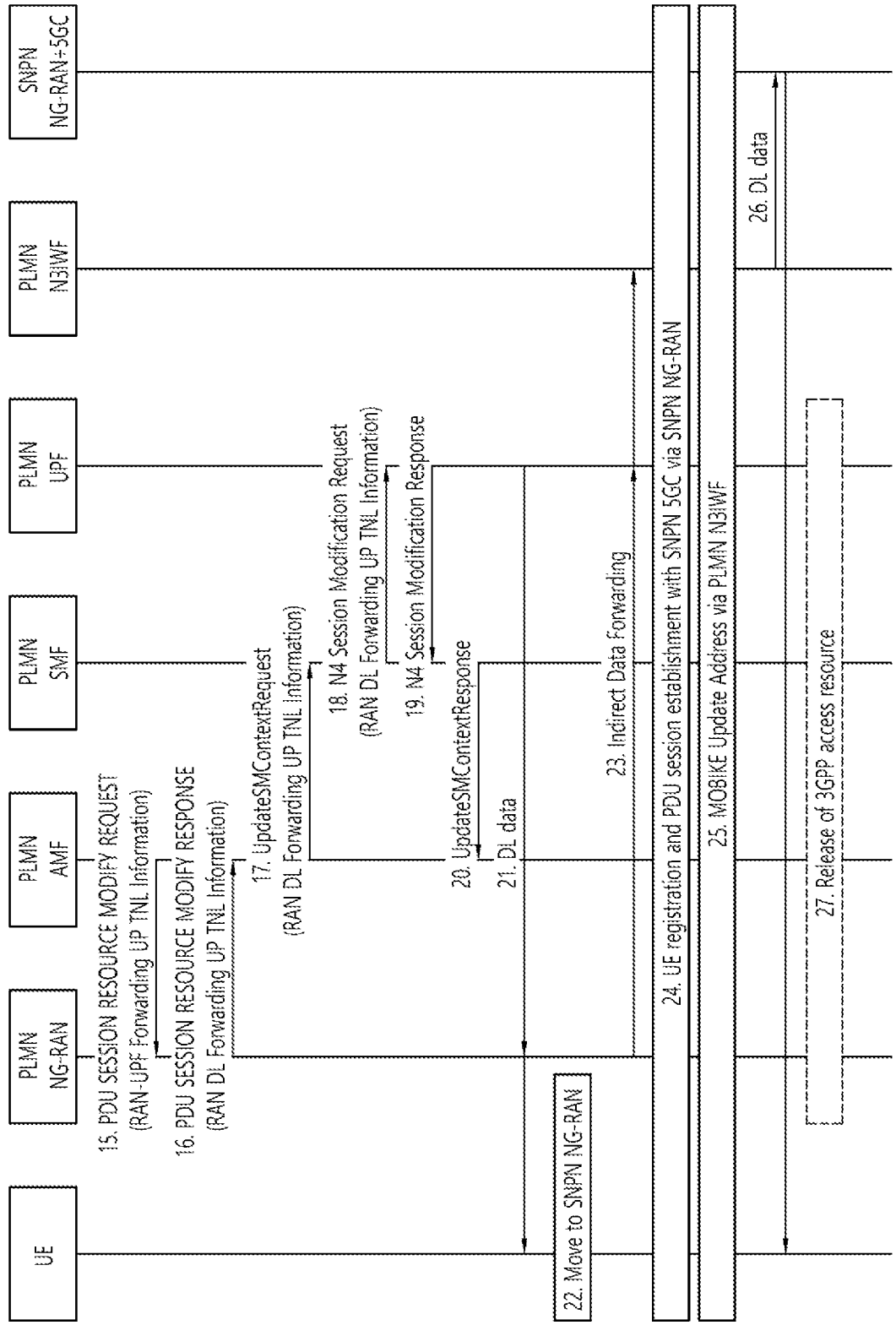

FIGS. 25 and 26 show an example of a procedure triggered by the SMF for establishment of indirect data forwarding before handover to which implementations of the present disclosure is applied.

First, the operations of FIG. 25 are described.

(1) Step 1: The UE registers in the PLMN via the PLMN NG-RAN according to the registration procedure described above in FIGS. 6 and 7. The UE establishes a PDU session via the PLMN NG-RAN according to the PDU Session Establishment procedure described above in FIGS. 8 and 9 to receive PLMN services.

(2) Step 2: The UE also performs registration to the PLMN via the PLMN N3IWF, according to the registration procedure described above in FIGS. 6 and 7, with the 5G-GUTI which was given to the UE when registering with the PLMN in step 1.

(3) Step 3: The UE performs steps 1-9 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

In this step, the UE may transmit the PDU Session Establishment Request message containing the PDU session ID of the on-going PDU session via the PLMN NG-RAN and the Request Type set to "Handover preparation between PLMN and SNPN" if the request refers to an existing PDU session handover between PLMN and SNPN. This information may enable the PLMN SMF to maintain both PDU sessions via the PLMN NG-RAN and the PLMN N3IWF, to continuously send the DL data via the PLMN NG-RAN, and not to trigger the UE context release procedure to release the resources in the PLMN NG-RAN. When the PLMN AMF received the PDU Session Establishment Request message with the Request Type set to "Handover preparation between PLMN and SNPN", the PLMN AMF may route the PDU Session Establishment Request message to the PLMN SMF that is associated with the PDU session ID the UE provided.

(4) Step 4: The PLMN SMF sends the N4 Session Modification Request message containing the indirect forwarding address request indication to the PLMN UPF. The indirect forwarding address request indication may be used to request to the PLMN UPF to allocate the tunnel address for the indirect data forwarding.

The PLMN SMF can request to the PLMN UPF to allocate the tunnel address for the indirect data forwarding in step 11.

The user's subscription may indicate if user is allowed to support service continuity for handover between PLMN and SNPN. This indication may be provided to the PLMN SMF from the PLMN UDM. Based on the UE request and/or the indication from the PLMN UDM, the PLMN SMF may indicate the PLMN NG-RAN, PLMN N3IWF, and PLMN UPF to set up the indirect forwarding tunnel.

(5) Step 5: The PLMN UPF allocates the two UPF forwarding UP TNL information (i.e., RAN-UPF forwarding UP TNL information and N3IWF-UPF forwarding UP TNL information) and returns an N4 Session Modification Response message to the PLMN SMF. The RAN-UPF forwarding UP TNL information may be used to establish the indirect data forwarding tunnel between the PLMN NG-RAN and the PLMN UPF. The N3IWF-UPF forwarding UP TNL information may be used to establish the indirect data forwarding tunnel between PLMN N3IWF and PLMN UPF.

(6) Step 6: The PLMN SMF provides to the PLMN AMF the N2 SM information containing the N3IWF-UPF forwarding UP TNL information by using the Namf_Communication_N1N2MessageTransfer message.

(7) Step 7: The PLMN AMF forwards the N2 SM information containing the N3IWF-UPF forwarding UP TNL information to the PLMN N3IWF by using the PDU Session Resource Setup Request message.

If the PLMN SMF requests to the PLMN UPF to allocate the tunnel address for the indirect data forwarding in steps 11 and 12, the PLMN SMF may include the explicit indication (e.g., indirect forwarding address request indication) to request to the PLMN N3IWF to allocate the tunnel address for the indirect data forwarding instead of the N3IWF-UPF forwarding UP TNL information.

Based on the N3IWF-UPF forwarding UP TNL information, the PLMN N3IWF can be aware that since the UE moves to the SNPN NG-RAN and the PDU session needs to be handed over to the PLMN N3IWF, the PLMN SMF requests to the PLMN N3IWF to allocate the tunnel address for the indirect data forwarding.

(8) Step 8: The PLMN N3IWF may issue AN specific signaling exchange with the UE that is related with the information received from the PLMN SMF.

This step may be performed after the setup of indirect forwarding tunnel between the PLMN NG-RAN and the PLMN N3IWF.

(9) Step 9: The PLMN N3IWF provides the N3IWF DL forwarding UP TNL information for each data forwarding tunnel by sending the PDU Session Resource Response message.

(10) Step 10: The PLMN AMF sends the Nsmf_PDUSession_UpdateSMContext Request message including the N2 SM information with the N3IWF DL forwarding UP TNL information.

(11) Step 11: The PLMN SMF sends the N4 Session Modification Request message containing the N3IWF DL forwarding UP TNL information to the PLMN UPF. If the indirect forwarding address request indication is not delivered in step 4, the PLMN SMF may include the indirect forwarding address request indication in this step to request to the PLMN UPF to allocate the tunnel address for the indirect data forwarding.

In this step, the PLMN UPF may update the UP path towards the PLMN N3IWF instead of the PLMN NG-RAN. In this case, the PLMN NG-RAN may use this indirect forwarding tunnel to forward to the PLMN N3IWF the DL data that was not delivered yet.

(12) Step 12: The PLMN UPF returns an N4 Session Modification Response message to the PLMN SMF. If the indirect forwarding address request indication is included in step 11, the PLMN UPF allocates the two UPF forwarding UP TNL information and sends it to the PLMN SMF.

(13) Step 13: The UE performs steps 16c-21 of the PDU Session Establishment procedure described above in FIGS. 8 and 9 to establish PDU session(s) with the PLMN via the PLMN N3IWF. For the PDU Session Establishment via untrusted non-3GPP access procedure, Section 4.21.5 of 3GPP TS 23.502 may be further referred.

(14) Step 14: The PLMN SMF provides to the PLMN AMF the N2 SM information containing the RAN-UPF forwarding UP TNL information by using the Namf_Communication_N1N2MessageTransfer message.

If the PLMN SMF decides not to keep the resource in PLMN NG-RAN in step 6, the Namf_Communication_N1N2MessageTransfer message may also include the explicit indication (e.g., indirect forwarding disabled indication) to indicate the PLMN NG-RAN not to allocate the tunnel information for indirect forwarding tunnel.

Next, the operations of FIG. 26 which follow the operations of FIG. 25 are described.

(15) Step 15: The PLMN AMF forwards the N2 SM information containing the RAN-UPF forwarding UP TNL information to the PLMN NG-RAN by using the PDU Session Resource Modify Request message and/or other NGAP message. Based on the received message and the RAN-UPF forwarding UP TNL information, the PLMN NG-RAN can be aware of the tunnel address for indirect data forwarding and of the UE mobility to the SNPN NG-RAN.

If the indirect forwarding disabled indication is not received in this step, the PLMN NG-RAN may also allocate the tunnel information for indirect forwarding to support subsequent handover from the SNPN NG-RAN to the PLMN NG-RAN.

(16) Step 16: The PLMN NG-RAN responses with the PDU Session Resource Modify message to the AMF containing the RAN DL forwarding UP TNL information.

(17) Step 17: The PLMN AMF sends the Nsmf_PDUSession_UpdateSMContext Request message including the N2 SM information with the RAN DL forwarding UP TNL information to the PLMN SMF.

(18) Step 18: The PLMN SMF sends the N4 Session Modification Request message containing the RAN DL forwarding UP TNL information to the PLMN UPF.

(19) Step 19: The PLMN UPF returns an N4 Session Modification Response message to the PLMN SMF.

(20) Step 20: The PLMN SMF responses with Nsmf_PDUSession_UpdateSMContext Response message.

(21) Step 21: The DL data is sent to the UE via the PLMN NG-RAN.

(22) Step 22: The UE detects need to move to the SNPN NG-RAN from the PLMN NG-RAN.

(23) Step 23: If the PLMN NG-RAN detects the UE is not reachable and there is pending DL data, the PLMN NG-RAN forwards the pending DL data to the PLMN N3IWF via the PLMN UPF.

(24) Step 24: The UE registers in the SNPN via the SNPN NG-RAN according to the registration procedure described above in FIGS. 6 and 7. The UE establishes a PDU session via the SNPN NG-RAN according to the PDU Session Establishment procedure described above in FIGS. 8 and 9 to receive SNPN services.

(25) Step 25: For option 1, the UE may initiate IPSec tunnel update procedure by sending the MOBIKE update address message.

In this step, the UE may include the NG-RAN Context Release indication to trigger the UE context release procedure to release the resources in the PLMN NG-RAN. In this case, the PLMN SMF may initiate the UE Context Release procedure in step 27. If the NG-RAN Context Release indication is not included, the PLMN SMF may decide not to release the indirect forwarding tunnel. From this moment, the PLMN UPF may send the DL data to the UE via the PLMN N3IWF. In this case, step 27 may be skipped.

For option 2, the UE may initiate IPsec tunnel update procedure by sending the MOBIKE update address message. After MOBIKE procedure is finished, the UE may send PDU Session Modification Request message including path switching indication and optionally the NG-RAN Context Release indication. The SMF may send the PDU Session Modification Command message to the UE in order to confirm UE's request.

(26) Step 26: The PLMN N3IWF sends the DL data to the UE.

(27) Step 27: If the PLMN SMF decides to keep the resource in PLMN NG-RAN or the NG-RAN Context Release indication is not included in step 25, this step is skipped.

If the PLMN SMF decides not to keep the resource in PLMN NG-RAN or the NG-RAN Context Release indication is included in step 25, the PLMN SMF executes the release of resource in the PLMN according to Section 4.3.4.2 of 3GPP TS 23.502 in order to release the resources over the PLMN via the PLMN NG-RAN.

According to embodiment 3 of the present disclosure, since the NG-RAN just forwards the DL data that was not delivered yet to the N3IWF, unnecessary data duplication can be avoided. In order to prepare the subsequent handover from the SNPN NG-RAN to the PLMN NG-RAN, based on the UE request or the SMF's decision, the PLMN SMF can reserve the resource in PLMN NG-RAN instead of releasing it.

4. Embodiment 4

According to embodiment 4 of the present disclosure, in order to support the service continuity for handover between the PLMN and SNPN, the UE attaches the network to receive PLMN or SNPN service, the 5GC may provide additional information to select a proper PLMN or SNPN to the UE.

The embodiment 4 of the present disclosure may be performed in advance before the embodiment 1-3 of the present disclosure is applied.

Figure 27:
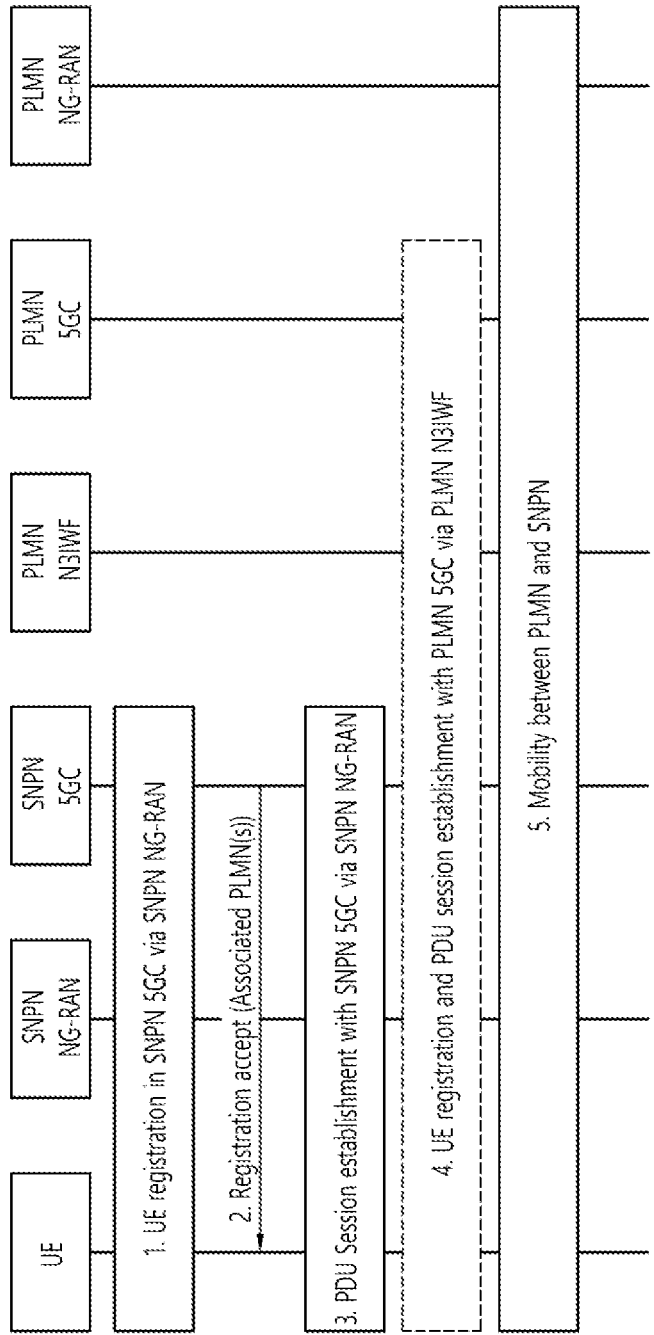
FIG. 27 shows an example of a dynamic control procedure for handover from/to associated PLMN(s) to which implementations of the present disclosure is applied.

FIG. 27 shows an example of a dynamic control procedure for handover from/to associated PLMN(s) to which implementations of the present disclosure is applied.

The procedure to be described below by referring to FIG. 27 may be applied to support the service continuity for handover from the SNPN NG-RAN to the PLMN NG-RAN. The procedure may also be applied to support the service continuity for handover from the PLMN NG-RAN to the SNPN NG-RAN.

(1) Step 1: The UE registers in the SNPN via the SNPN NG-RAN according to the registration procedure described above in FIGS. 6 and 7.

(2) Step 2: The SNPN 5GC sends the Registration Accept message including information on the associated PLMN(s). The information on the associated PLMN(s) may be used to indicate the UE which PLMN has the service level agreement (SLA) with the SNPN. In other words, these PLMN(s) indicated by the information on the associated PLMN(s) can support the service continuity of the handover from/to the SNPN based on the SLA. Based on this information, the UE may select a PLMN in the associated PLMN(s) and registers to the PLMN to perform following steps.

(3) Step 3: The UE establishes a PDU session via the SNPN NG-RAN according to the PDU Session Establishment procedure described above in FIGS. 8 and 9 to receive SNPN services.

(4) Step 4: If needed, the UE also registers in the PLMN via the PLMN N3IWF according to the registration procedure described above in FIGS. 6 and 7. The UE establishes a PDU session via the PLMN N3IWF according to the PDU Session Establishment procedure described above in FIGS. 8 and 9 to receive PLMN services. For the PDU Session Establishment via untrusted non-3GPP access procedure, Section 4.21.5 of 3GPP TS 23.502 may be further referred.

(5) Step 5: When the UE moves to the PLMN NG-RAN, the UE and/or network can initiate the procedures to support service continuity for the handover between the PLMN and SNPN.

According to embodiment 4 of the present disclosure, the network can dynamically control for handover from/to associated PLMN(s), which has SLA between PLMN and SNPN. Therefore, even if some PLMNs does not have SLA with SNPN any more, the UE can select a proper PLMN or SNPN.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a session management function (SMF) of a first network adapted to operate in a wireless communication, the method comprising:
performing a first protocol data unit (PDU) session establishment procedure for a wireless device via a next generation radio access network (NG-RAN) of the first network;
performing a second PDU session establishment procedure for the wireless device via a non-3GPP interworking function (N3IWF) of the first network;
transmitting, to a user plane function (UPF) of the first network, a duplication request for the UPF of the first network to duplicate downlink (DL) data and send the duplicated DL data to both the NG-RAN of the first network and the N3IWF of the first network; and
transmitting, to the N3IWF of the first network via an access and mobility management function (AMF) of the first network, a data buffering request for the N3IWF of the first network to buffer the duplicated DL data.

2. The method of claim 1, wherein the second PDU session establishment procedure comprises receiving a PDU Session Establishment Request message which includes 1) a PDU session identifier (ID) of an on-going PDU session via the NG-RAN of the first network, and 2) a request type set to handover preparation between the first network and a second network.

3. The method of claim 1, further comprising, after the wireless device is moved from the first network to a second network, receiving a Update session management (SM) Context Request message from the AMF of the first network to indicate that the wireless devices accesses to the N3IWF of the first network via a NG-RAN of the second network.

4. The method of claim 3, wherein the Update SM Context Request message includes a NG-RAN Context Release indication to trigger user equipment (UE) context release procedure to release resources in the NG-RAN of the first network.

5. The method of claim 4, further comprising, based on the NG-RAN Context Release indication, transmitting a duplication stop indication which indicates the UPF of the first network to stop duplicating the DL data.

6. The method of claim 3, further comprising transmitting a Update SM Context Response message to the AMF of the first network in response to the Update SM Context Request message.

7. The method of claim 6, wherein the Update SM Context Response message includes a data delivery request indication for the N3IWF of the first network to initiate delivery of the DL data.

8. The method of claim 3, wherein the first network is a public land mobile network (PLMN), and
wherein the second network is a stand-alone non-public network (SNPN).

9. The method of claim 3, wherein the first network is a SNPN, and
wherein the second network is a PLMN.

10. A method performed by a wireless device adapted to operate in a wireless communication, the method comprising:
performing a first protocol data unit (PDU) session establishment procedure with a first network to establish a first PDU session via a next generation radio access network (NG-RAN) of the first network;
performing a second PDU session establishment procedure with the first network to establish a second PDU session via a non-3GPP interworking function (N3IWF) of the first network, wherein a downlink (DL) data is duplicated in a user plane function (UPF) of the first network and sent to both the NG-RAN of the first network and the N3IWF of the first network;
receiving the duplicated DL data from the NG-RAN of the first network based on the first PDU session;
moving to a second network from the first network;
performing a third PDU session establishment procedure with the second network to establish a third PDU session via a NG-RAN of the second network;
transmitting, to the N3IWF of the first network, 1) a path switch indication informing that the wireless device moves to the second network from the first network, and 2) a NG-RAN context release indication to trigger UE context release procedure to release resources in the NG-RAN of the first network; and
receiving the duplicated DL data from the N3IWF of the first network via the NG-RAN of the second network based on the third PDU session.

11. The method of claim 10, wherein the second PDU session establishment procedure comprises transmitting a PDU Session Establishment Request message which includes 1) a PDU session identifier (ID) of an on-going PDU session via the NG-RAN of the first network, and 2) a request type set to handover preparation between the first network and a second network.

12. The method of claim 10, wherein 1) the path switch indication and 2) the NG-RAN context release indication is transmitted via a MOBIKE update address message.

13. The method of claim 12, wherein a MOBIKE address verification message is received from the N3IWF of the first network in response to the MOBIKE update address message.

14. The method of claim 1, wherein the wireless device is in communication with at least one of a mobile device, a network, and/or autonomous vehicles other than the wireless device.

15. A wireless device adapted to operate in a wireless communication system, the wireless device comprising:
at least one transceiver;
at least one processor; and
at least one memory operably connectable to the at least one processor and storing instructions that, based on being executed by the at least one processor, perform operations comprising:
performing a first protocol data unit (PDU) session establishment procedure with a first network to establish a first PDU session via a next generation radio access network (NG-RAN) of the first network;
performing a second PDU session establishment procedure with the first network to establish a second PDU session via a non-3GPP interworking function (N3IWF) of the first network, wherein a downlink (DL) data is duplicated in a user plane function (UPF) of the first network and sent to both the NG-RAN of the first network and the N3IWF of the first network;
receiving the duplicated DL data from the NG-RAN of the first network based on the first PDU session;
moving to a second network from the first network;
performing a third PDU session establishment procedure with the second network to establish a third PDU session via a NG-RAN of the second network;
receiving the duplicated DL data from the N3IWF of the first network via the NG-RAN of the second network based on the third PDU session; and
transmitting, to the N3IWF of the first network, 1) a path switch indication informing that the wireless device moves to the second network from the first network, and 2) a NG-RAN context release indication to trigger UE context release procedure to release resources in the NG-RAN of the first network.

\* \* \* \* \*